(12) United States Patent
Choi et al.

(10) Patent No.: US 7,791,450 B2
(45) Date of Patent: Sep. 7, 2010

(54) CERAMIC COMPONENT AND METHOD OF MANUFACTURING THE SAME

(75) Inventors: Kwang-Hwi Choi, Kyeonggi-do (KR); Seong-Soo Jo, Kyeonggi-do (KR); Sun-Ki Kim, Kyeonggi-do (KR)

(73) Assignee: Joinset Co., Ltd. (KR)

( * ) Notice: Subject to any disclaimer, the term of this patent is extended or adjusted under 35 U.S.C. 154(b) by 61 days.

(21) Appl. No.: 12/346,661

(22) Filed: Dec. 30, 2008

(65) Prior Publication Data

US 2009/0108984 A1 Apr. 30, 2009

Related U.S. Application Data

(63) Continuation of application No. PCT/KR2007/002413, filed on May 17, 2007.

(30) Foreign Application Priority Data

Jul. 19, 2006 (KR) .................... 10-2006-0067611

(51) Int. Cl.
*H01C 7/10* (2006.01)
(52) U.S. Cl. .................... 338/22 R; 338/307; 338/21
(58) Field of Classification Search .................... 338/20, 338/21, 22 R, 307–309; 29/612, 623
See application file for complete search history.

(56) References Cited

U.S. PATENT DOCUMENTS 6,163,246 A * 12/2000 Ueda et al. .................. 338/331
6,232,867 B1 * 5/2001 Yoshida et al. .............. 338/21
6,522,237 B1 * 2/2003 Ito et al. ...................... 338/22 R
7,075,404 B2 * 7/2006 Hirose et al. ................ 338/21

FOREIGN PATENT DOCUMENTS

| JP | 05-191047 A | 7/1993 |
| JP | 09-293604 A | 11/1997 |
| JP | 2005-079426 A | 3/2005 |

OTHER PUBLICATIONS

PCT Written Opinion of the International Searching Authority; Sep. 11, 2007.

* cited by examiner

*Primary Examiner*—Kyung Lee
(74) *Attorney, Agent, or Firm*—Park & Associates IP Law LLC

(57) ABSTRACT

Provided are a ceramic component and a method of manufacturing the ceramic component. The ceramic component includes a previously fired insulation ceramic base, a functional ceramic sheet bonded to the insulation ceramic base by a diffusion bonding layer having an anchoring structure, internal electrodes embedded into the functional ceramic sheet, and external electrodes connected to the internal electrodes. A functional ceramic paste corresponding to the functional ceramic sheet is applied to the insulation ceramic base and is dried to form a functional ceramic film. The functional ceramic film is pressed against the insulation ceramic base to anchor functional ceramic film into the insulation ceramic base for sure attachment. The functional ceramic film is fired to allow functional oxide materials included in the functional ceramic film to permeate the insulation ceramic base by solid diffusion to form the diffusion bonding layer and to change the functional ceramic film into the functional ceramic sheet.

17 Claims, 13 Drawing Sheets

CERAMIC COMPONENT AND METHOD OF MANUFACTURING THE SAME

REFERENCE TO RELATED APPLICATIONS

This a continuation of pending International Patent Application PCT/KR2007/002413 filed on May 17, 2007, which designates the United States and claims priority of Korean Patent Application No. 10-2006-0067611 filed on Jul. 19, 2006, the entire contents of which are incorporated herein by reference.

FIELD OF THE INVENTION

The present invention relates to a ceramic component and a method of manufacturing the ceramic component.

BACKGROUND OF THE INVENTION

With the demand for electronic devices having high-level functions, the use of functional ceramic components has been increased for integration of electronic devices. Examples of functional ceramic components include a chip varistor and a chip thermistor. The chip varistor prevents malfunctioning of an electronic device by protecting a semiconductor device of the electronic device from electrostatic discharge, and the thermistor has a temperature-dependent resistance to inform an active component such as a microcomputer of an abnormal temperature condition.

Generally, a ceramic component can be manufactured by stacking green sheets corresponding to functional ceramic sheets or forming a functional ceramic paste layer using a thick-layer printing method.

In a thick-layer printing method using a chip resistor manufacturing technique, functional ceramic powder is mixed with an ethyl cellulose binder and a fixer including an emulsifier and glass frit to form functional ceramic paste. Then, a thick layer is formed on an insulation ceramic base by a screen printing method using the functional ceramic paste. Thereafter, the insulation ceramic base including the thick layer is fired to form a functional ceramic chip component. Here, the insulation ceramic base including the thick layer is fired (heat treated) at a predetermined temperature such that the glass frit included in the functional ceramic paste can be fused and bonded to the insulation ceramic base. Through the heat treatment, the functional ceramic paste is formed into a functional ceramic sheet exhibiting electrical properties.

In the structure of the functional ceramic component formed by the thick-layer printing method, the insulation ceramic base functions as a basic structure for maintaining the mechanical strength and dimensions of the functional ceramic component.

SUMMARY OF THE INVENTION

According to the thick-layer printing method, the functional ceramic paste includes glass frit, and the thick layer is formed on the insulation ceramic base by screen-printing. Therefore, the thick-layer printing method has the following disadvantages.

(1) Since the bonding status between the insulation ceramic base and the functional ceramic sheet is determined by the glass frit of the functional ceramic paste fused and bonded between the insulation ceramic base and the functional ceramic sheet, the bonding surface can be unstable when the glass frit is not uniformly distributed. In this case, the functional ceramic sheet can be easily cracked and separated from the insulation ceramic base even by a small thermal or mechanical impact, thereby decreasing product reliability.

(2) When a functional ceramic film is formed of functional ceramic paste through screen printing and drying processes, it is difficult to form the functional ceramic film to a uniform thickness due to, for example, variations of the thickness of a screen mesh wire and the thickness of emulsion. Particularly, when the functional ceramic film has a large area, thickness deviation of the functional ceramic film increases much more, and thus the electrical properties of a final product deviate largely.

(3) The thickness of the functional ceramic sheet is determined by the type of a screen used for printing the functional ceramic paste, and the functional ceramic paste can be printed and dried two or more times to form a more thicker functional ceramic.

However, it is difficult to productively form a reliable multi-layer stacked structure such as a multi-layer ceramic capacitor (MLCC) by printing the functional ceramic paste two or more times due to accumulation of thickness deviation.

(4) Since the functional ceramic paste is formed into the functional ceramic sheet through three processes of printing, drying, and firing, a functional ceramic film, which is formed by printing the functional ceramic paste on the insulation ceramic base and drying the functional ceramic paste, has a number of pores in its surface and body. Such pores are not completely removed after a firing process such that the density of the functional ceramic sheet is decreased due to the pores. Furthermore, when the functional ceramic film is interposed between a pair of internal electrodes, the internal electrodes can permeate the functional ceramic film through the pores. In this case, a short circuit can occur between the internal electrodes after the functional ceramic film is fired.

When a component is manufactured using the thick-layer printing method, internal electrodes are inevitably formed on the same plane as a functional ceramic film and arranged in a single layer due to the above-described disadvantages of the thick-layer printing method. Meanwhile, although internal electrodes can be formed on both sides of a functional ceramic sheet, the thickness of the functional ceramic sheet should be large in this case.

Due to these restrictions, it is difficult to design a component using the thick-layer printing method. Therefore, the use of the thick-layer printing method is limited. For example, it is difficult to manufacture precise products using the thick-layer printing method at a high production rate.

According to another method of manufacturing a functional ceramic chip component, a fired functional ceramic sheet is bonded to a top surface of a fired insulation ceramic base using an additional adhesive. However, the use of an additional adhesive such as glass results in disadvantages in terms of process simplicity, size reduction, and manufacturing costs.

In another conventional method, a functional ceramic target material is applied to an insulation ceramic base by vapor deposition, plasma coating, or thermal spraying like in a semiconductor manufacturing process in order to manufacture a thin-film functional ceramic component. However, this method requires additional equipment such as an expensive vacuum chamber and an electrical functional material that is difficult to develop. In addition, it is difficult to form a thick functional ceramic film. Therefore, it is difficult to manufacture products having desired electric characteristics.

An object of the present invention is to provide a ceramic component including a reliable diffusion bonding layer (diffusion reaction layer) formed by applying a functional ceramic paste not including an inorganic adhesive such as glass frit to an insulation ceramic base and firing the functional ceramic paste.

Another object of the present invention is to provide a reliable ceramic component in which a functional ceramic film formed by a screen printing method is pressed prior to a firing process so as to reduce variations in the thickness and roughness of the functional ceramic film and improve electric characteristics of the functional ceramic film.

Another object of the present invention is to provide a non-expensive ceramic component by bonding a functional ceramic print layer only to a desired region of an insulation ceramic base.

Another object of the present invention is to provide a ceramic component including a functional ceramic film that is adjustable in thickness.

Another object of the present invention is to provide a multifunctional ceramic component by stably bonding ceramic materials having different electric and mechanical characteristics without cracks or bending, and a method of manufacturing the multifunctional ceramic component.

Additional advantages, objects, and features of the invention will be set forth in part in the description which follows and in part will become apparent to those having ordinary skill in the art upon examination of the following or may be learned from practice of the invention.

Advantageous Effects

As described above, the present invention provides various advantages as follows.

The insulation ceramic base is previously prepared by firing, and the functional ceramic film is formed on the insulation ceramic base by printing and drying using functional ceramic paste. The functional ceramic film is physically bonded to the insulation ceramic base through isothermal and isobaric pressing. Then, the functional ceramic film is converted into the functional ceramic sheet by firing, and at the same time, the diffusion bonding layer is formed between the insulation ceramic base and the functional ceramic sheet since functional oxides transfer from the functional ceramic sheet into the insulation ceramic base by solid diffusion. The diffusion bonding layer increases the bonding strength between the insulation ceramic base and the functional ceramic sheet, and thus a reliable functional ceramic component can be manufactured without cracks or bending.

Furthermore, the temperature and pressure of the isothermal and isobaric pressing process are adjusted according to the characteristics of the binder included in the functional ceramic film so that the functional ceramic film can be physically attached to the insulation ceramic base more firmly. At the same time, an anchoring structure can be formed between the insulation ceramic base and the functional ceramic film. Therefore, after the firing process, the diffusion bonding layer having chemically, thermally, physically, and mechanically reliable anchoring structure can be formed between the insulation ceramic base and the functional ceramic sheet.

Furthermore, owing to the isothermal and isobaric pressing process, the active layer, which relates to the surface roughness and electric characteristics of the functional ceramic film, can decrease in thickness deviation and increase in density. Thus, the functional ceramic sheet of a final product can have a high density and low thickness deviation. Therefore, ceramic components having less deviation in electric characteristics and improved reliability (e.g., against thermal impacts) can be manufactured with high manufacturing yield.

Furthermore, the insulation ceramic base is surface treated by, for example, etching or polishing. Therefore, during the isothermal and isobaric pressing process, the functional ceramic film can be attached to the insulation ceramic base more firmly by a anchoring structure. As a result, in a final product, the diffusion bonding layer can be reliably formed between the insulation ceramic base and the functional ceramic sheet.

Furthermore, a binder having a softening point at the temperature of the isothermal and isobaric pressing process is used for the functional ceramic paste so that the functional ceramic film can be attached to the insulation ceramic base more firmly by the isothermal and isobaric pressing process, and the density of the functional ceramic film can be increased. Therefore, after the firing process, the electric and mechanical characteristics of the functional ceramic sheet can be improved. Accordingly, reliable ceramic components can be provided.

In addition, since the functional ceramic sheet bonded to the insulation ceramic base by the diffusion reaction layer (diffusion bonding layer) has a high surface density and uniform roughness, a different functional ceramic device can be easily formed on the functional ceramic sheet. That is, a multifunctional ceramic component can easily be provided.

While the present invention has been described in detail, it should be understood that various changes, substitutions and alterations can be made hereto without departing from the spirit and scope of the invention as defined by the appended claims.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE INVENTION

Figure 1:
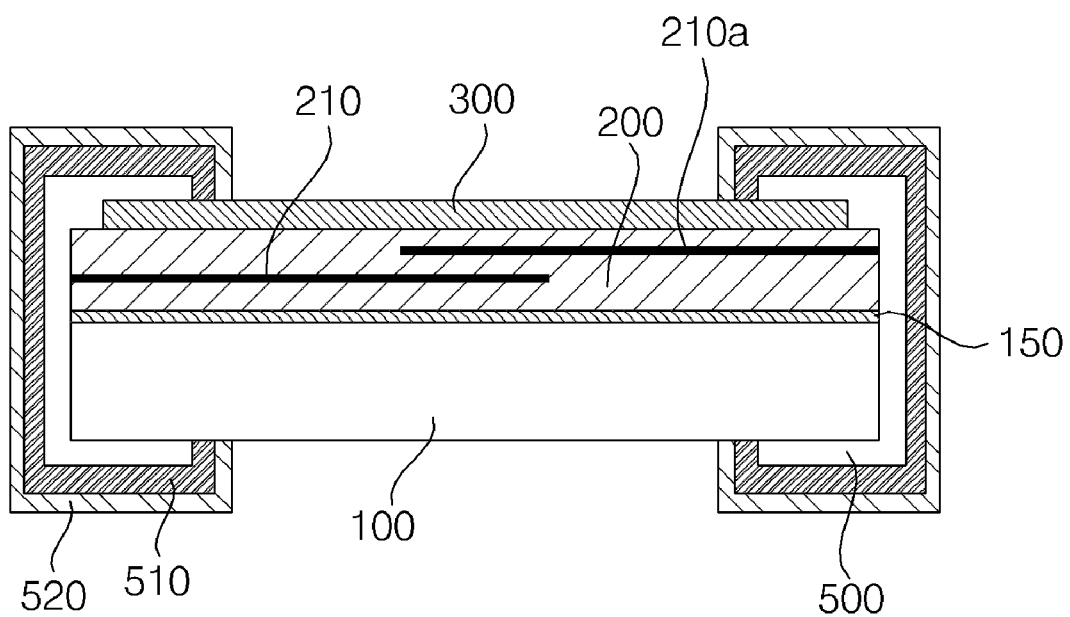
FIG. 1 is a cross-sectional view illustrating a ceramic component according to an embodiment of the present invention.

According to an aspect of the present invention, there is provided a ceramic component including: a previously fired insulation ceramic base; a functional ceramic sheet bonded to a surface of the insulation ceramic base by a diffusion bonding layer having an anchoring structure; a pair of internal electrodes embedded into the functional ceramic sheet; and external electrodes electrically connected to the internal electrodes, wherein a functional ceramic paste corresponding to the functional ceramic sheet is applied to the surface of the insulation ceramic base by a printing method and is dried to form a functional ceramic film, the functional ceramic film is pressed against the surface of the insulation ceramic base to anchor the functional ceramic film into the insulation ceramic base for secure attachment, and the functional ceramic film is fired to allow functional oxide materials included in the functional ceramic film to permeate the insulation ceramic base by solid diffusion so as to form the diffusion bonding layer and to change the functional ceramic film into the functional ceramic sheet.

According to another aspect of the present invention, there is provided a ceramic component including: a previously fired insulation ceramic base; a first functional ceramic sheet bonded to one side of the insulation ceramic base by a diffusion bonding layer having an anchoring structure; a second functional ceramic sheet bonded to the other side of the insulation ceramic base by a diffusion bonding layer having an anchoring structure; at least one pair of internal electrodes embedded into each of the first and second functional ceramic sheets; and external electrodes electrically connected to the internal electrodes, wherein functional ceramic pastes corresponding to the first and second functional ceramic sheets and having different electric characteristics are respectively applied to both the sides of the insulation ceramic base by a printing method and are dried to form first and second functional ceramic films, the first and second functional ceramic films are pressed against the insulation ceramic base to anchor the first and second functional ceramic films into the insulation ceramic base for secure attachment, and the first and second functional ceramic films are fired to allow functional oxide materials included in the first and second functional ceramic films to permeate the insulation ceramic base by solid diffusion so as to form the diffusion bonding layers and to change the first and second functional ceramic films into the first and second functional ceramic sheets.

According to another aspect of the present invention, there is provided a ceramic component including: a previously fired insulation ceramic base; a first functional ceramic sheet bonded to a surface of the insulation ceramic base by a diffusion bonding layer having an anchoring structure; a second functional ceramic sheet bonded to a surface of the first functional ceramic sheet; at least one pair of internal electrodes embedded into each of the first and second functional ceramic sheets; and external electrodes electrically connected to the internal electrodes, wherein a functional ceramic paste corresponding to the first functional ceramic sheet is applied to the surface of the insulation ceramic base by a printing method and is dried to form a first functional ceramic film, the first functional ceramic film is pressed against the insulation ceramic base to anchor the first functional ceramic film into the insulation ceramic base for secure attachment, and the first functional ceramic film is fired to allow functional oxide materials included in the first functional ceramic film to permeate the insulation ceramic base by solid diffusion so as to form the diffusion bonding layer and to change the first functional ceramic film into the first functional ceramic sheet, wherein a functional ceramic paste corresponding to the second functional ceramic sheet is applied to the surface of the first functional ceramic sheet by a printing method and is dried to form a second functional ceramic film, and the second functional ceramic film is fired to allow glass frit included in the second functional ceramic film to change into liquid and back to solid for firmly bonding the second functional ceramic film to the first ceramic sheet.

The functional ceramic paste or the first functional ceramic paste may include less than 100 ppm of glass frit.

The diffusion bonding layer may be formed of an intermediate material between materials of the functional ceramic sheet and the insulation ceramic base.

The insulation ceramic base may include one of aluminum nitride, alumina, and silicon.

The insulation ceramic base may be surface treated by one of etching and polishing.

The functional ceramic paste may include 40 to 80 weight % of functional ceramic powder and 5 to 30 weight % of binder solid matter.

A binder included in the functional ceramic paste may have a softening point at a temperature of an isothermal and isobaric pressing process.

The functional ceramic sheet may have magnetic characteristics or semiconductor characteristics.

The first functional ceramic sheet may be formed into one of a varistor and a thermistor, and the second functional ceramic sheet may be formed into a resistor.

The ceramic component may further include a protection layer formed of one of glass, epoxy, and a dielectric ceramic material to protect the functional ceramic sheet.

According to another aspect of the present invention, there is provided a ceramic component including: a previously fired insulation ceramic base; a first functional ceramic sheet bonded to a surface of the insulation ceramic base by a diffusion bonding layer having an anchoring structure; a plurality of second functional ceramic sheets bonded to a surface of the first functional ceramic sheet and separate from each other; at least one pair of internal electrodes embedded into each of the first and second functional ceramic sheets; and external electrodes electrically connected to the internal electrodes, wherein a functional ceramic paste corresponding to the first functional ceramic sheet is applied to the surface of the insulation ceramic base by a printing method and is dried to form a first functional ceramic film, the first functional ceramic film is pressed against the insulation ceramic base to anchor the first functional ceramic film into the insulation ceramic base for secure attachment, and the first ceramic film is fired to allow functional oxide materials included in the first functional ceramic film to permeate the insulation ceramic base by solid diffusion so as to form the diffusion bonding layer and to change the first functional ceramic film into the first functional ceramic sheet, wherein functional ceramic pastes corresponding to the second functional ceramic sheets are applied to the surface of the first functional ceramic sheet by a printing method and are dried to form second functional ceramic films, and the second functional ceramic films are fired to allow glass frit included in the second functional ceramic films to change into liquid and back to solid for firmly bonding the second functional ceramic films to the first ceramic sheet.

According to another aspect of the present invention, there is provided a method of manufacturing a ceramic component, the method including: applying a functional ceramic paste to a top surface of a previously fired insulation ceramic base wafer by printing; drying the functional ceramic paste to form a first functional film; forming a first internal electrode on a surface of the first functional ceramic film; applying the functional ceramic paste to the surface of the first functional ceramic film by printing so as to cover the first internal electrode; drying the functional ceramic paste applied to the surface of the first functional ceramic film so as to form a second functional ceramic film; forming a second internal electrode on a surface of the second functional ceramic film; applying the functional ceramic paste to the surface of the second functional ceramic film by printing so as to cover the second internal electrode; drying the functional ceramic paste applied to the surface of the second functional ceramic film so as to form a third functional ceramic film; pressing the first to third functional ceramic films; removing a binder included in the first to third functional ceramic films; firing the first to third functional ceramic films so as to form a single functional ceramic sheet; breaking the functional ceramic sheet formed on the insulation ceramic base wafer into individual chips; and forming external electrodes in electric connection with exposed portions of the first and second internal electrodes that are electrically connected to the functional ceramic sheet.

The pressing of the first to third functional ceramic films may be performed under isothermal and isobaric conditions.

Now, preferred embodiments of the present invention will be described in detail with reference to the accompanying drawings. In the figures, the dimensions of layers and regions are exaggerated for clarity of illustration.

Figure 2:
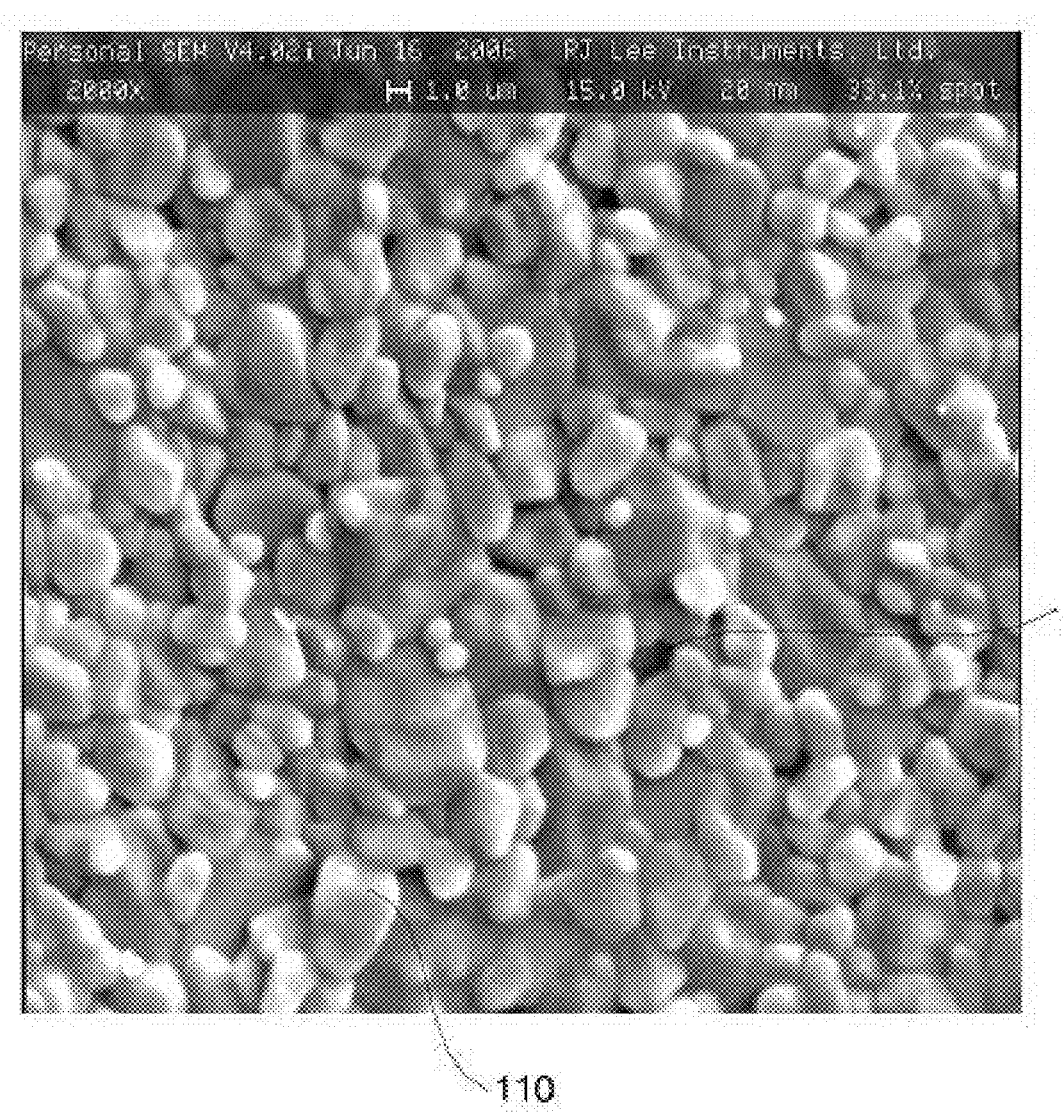
FIG. 2 is a photographic image illustrating a surface of an insulation ceramic base according to an embodiment of the present invention.

FIG. 1 is a cross-sectional view illustrating a ceramic component according to an embodiment of the present invention, and FIG. 2 is a photographic image illustrating a surface of an insulation ceramic base 100 according to an embodiment of the present invention.

Referring to FIG. 1, the ceramic component of the current embodiment includes an fired insulation ceramic base 100 and functional ceramic sheet 200 bonded to a top surface of the insulation ceramic base 100 using a diffusion bonding layer 150.

The functional ceramic sheet 200 is bonded to the insulation ceramic base 100 as follows. Functional ceramic paste corresponding to the functional ceramic sheet 200 is printed and dried on the insulation ceramic base 100 to form a functional ceramic film, and the functional ceramic film is physically compressed against the insulation ceramic base 100. Then, the functional ceramic film is fired to diffuse a functional oxidation material included in the functional ceramic film into the insulation ceramic base 100 by solid diffusion. In this way, the diffusion bonding layer 150 is formed between the insulation ceramic base 100 and the functional ceramic sheet 200 for bonding.

Hereinafter, it will be described in more detail about the bonding between the insulation ceramic base 100 and the functional ceramic sheet 200 by the diffusion bonding layer 150.

Referring to FIG. 2, the insulation ceramic base 100 may have a polycrystalline surface with a number of grains 110 having different sizes. Pores are formed in the grains 110 and between grains 110 (hereinafter, referred to as grain pores and inter-grain pores 122, respectively). The grain pores and the inter-grain pores 122 affect the surface roughness of the insulation ceramic base 100 and anchoring of the functional ceramic sheet 200. Further, materials are transferred through the grain pores and the inter-grain pores 122 by solid diffusion in a firing operation (described later).

According to the present invention, a functional ceramic film is formed on the insulation ceramic base 100 by printing and drying functional ceramic paste on a predetermined region of the insulation ceramic base 100. Then, the functional ceramic film is compressed in an isothermal and isobaric environment and is fired through a binder burn-out operation to form the functional ceramic sheet 200. At this time, the diffusion bonding layer 150 is formed between the insulation ceramic base 100 and the functional ceramic sheet 200 by chemical solid diffusion.

Although it is difficult to determine the phase shape of the diffusion bonding layer 150 by current scientific analysis, the diffusion bonding layer 150 is formed of a material intermediate between those of the functional ceramic sheet 200 and the insulation ceramic base 100. The properties of the diffusion bonding layer 150, such as volume, electrical characteristics, and phase state, can vary depending on the firing temperature, time, pressure, etc. However, once the diffusion bonding layer 150 is completely formed, the properties of the diffusion bonding layer 150 does not vary.

The insulation ceramic base 100 is previously prepared, for example, by firing polycrystalline alumina or aluminum nitride. The firing temperature for the insulation ceramic base 100 is higher than that for the functional ceramic sheet 200 by at least 200° C. Otherwise, the insulation ceramic base 100 can bend when the functional ceramic film is fired to form the functional ceramic sheet 200. Further, the insulation ceramic base 100 may have an insulation resistance of greater than $10^9$ ohm in the temperature range from −55° C. to 300° C. in which ceramic components are usually used.

The functional ceramic paste will now be described in more detail.

The functional ceramic paste includes 40 to 80 weight % of functional ceramic powder and 20 to 40 weight % of a binder solution. The functional ceramic paste is prepared by a conventional manufacturing method including raw material weight measurement, initial mixing, and milling with a three-stage roller. The functional ceramic paste has a viscosity of 150 kcps±50 kcps at 25° C. and 10 rpm.

When the functional ceramic paste includes less than 40 weight % of functional ceramic powder (solid matter), cracks can occur at a surface of a functional ceramic film formed by screen-printing and drying the functional ceramic paste, and the functional ceramic sheet 200 formed by firing the functional ceramic film can be excessively shrunken. Furthermore, the functional ceramic sheet 200 can come off the insulation ceramic base 100. When the functional ceramic paste includes more than 80 weight % of functional ceramic powder, the functional ceramic film cannot be firmly attached to the insulation ceramic base 100 in a subsequent isothermal/isobaric pressing operation since the percentage of the binder solution is relative low.

The binder solution of the functional ceramic paste includes 5 to 30 weight % of binder solid matter, 10 to 25 weight % of a plasticizer, 40 to 70 weight % of solvent, and 1 weight % of a lubricant.

When the binder solution includes more than 30 weight % of binder solid matter, the functional ceramic sheet 200 can be excessively shrunken after firing like in the case where the functional ceramic paste includes less than 40 weight % of functional ceramic powder. When the binder solution includes less than 5 weight % of binder solid matter, the same problem as in the case where the functional ceramic paste includes more than 80 weight % of functional ceramic powder.

For example, the binder solution may include polyvinylbutyral as the binder solid matter, dioctyl phthalate (DOP) as the plasticizer, alpha-terpineol as the solvent, and castor oil as the lubricant.

Polyvinylbutyral having a low softening point of 65° C. is selected as the binder solid matter since an isothermal and isobaric pressing operation is performed in the range from 75 to 80° C. as one of main operations of a method of manufacturing a ceramic component according to the present invention. In detail, the functional ceramic paste is applied to a predetermined region of the insulation ceramic base 100 by screen printing and is dried in order to form a functional ceramic film. Then, the functional ceramic film is pressed in an isothermal and isobaric operation such that the binder component of the functional ceramic film can be sufficiently pressed at its softening point to increase the density and thickness uniformity of the functional ceramic film. Furthermore, the binder component of the functional ceramic film can easily permeate the insulation ceramic base 100 through pores formed in the insulation ceramic base 100. As a result, the binder included in the functional ceramic film increases the density of the functional ceramic sheet 200 and the bonding strength between the functional ceramic sheet 200 and the insulation ceramic base 100.

Although the binder solution of the functional ceramic paste can include ethyl cellulose that is generally used for conventional metal functional paste as the binder solid matter and dibutyl phthalate as the plasticizer, since the ethyl cellulose has a softening point in the range from 155 to 162° C., the ethyl cellulose cannot be softened during an isothermal and isobaric pressing operation carried out in the temperature range from 65 to 90° C. Therefore, the functional ceramic film is not sufficiently shrunken and the density of the functional ceramic film is not increased to a desired level after the isothermal and isobaric pressing operation. In this case, a hot press method can be used to press the functional ceramic paste in a single-axis pressing manner in the temperature range allowing softening of the binder solid matter included in the functional ceramic paste. Then, the functional ceramic sheet 200 formed by the hot press method is fired at a relatively higher temperature for a longer time to increase the density of the functional ceramic sheet 200.

The binder solid matter and solvent of the binder solution can be varied according to the conditions of the pressing operation. In this case, the softening point of the binder solid matter may be the most important factor for selecting the kind of the binder solid matter.

In the case where the binder solid matter is changed but the conditions of the pressing operation are not changed, the electrical characteristics of the functional ceramic sheet 200 can be adjusted by varying the conditions of the firing operation. Furthermore, although the binder solid matter is not changed, the density and thickness shrinkage of the functional ceramic film and the bonding strength between the insulation ceramic base 100 and the functional ceramic sheet 200 can be adjusted by varying the conditions of the pressing operation, such as temperature, pressure, time.

Next, it will now be described more fully how the functional ceramic sheet 200 is formed from a functional ceramic film.

In the present invention, the term "functional ceramic film" is used to collectively denote thick films having a thickness of about several to several tens of micrometers, which are formed by adding an additive, a lubricant, a diluent, and a binder into powder of functional oxides to form paste, applying the paste to a predetermined region of an insulation ceramic base using a screen printing method, and blowing hot air to the printed paste to evaporate volatile matters such as the diluent and the additive from the printed paste.

Ninety percents of the binder included in the functional ceramic film is removed through a binder burn-out operation, and then the remaining ten percent of the binder is completely removed through a firing operation. During the firing operation, the functional oxides included in the functional ceramic film are densified by chemical reaction so that the functional ceramic film can be formed into a functional ceramic sheet having mechanical and electrical characteristics.

Anchoring of the functional ceramic film will now be described.

When the insulation ceramic base 100 is formed of polycrystalline alumina or aluminum nitride, the grain pores of the insulation ceramic base 100 may have a size of less than 1 µm, and the inter-grain pores 122 of the insulation ceramic base 100 may have a size in the range of 1 µm to 3 µm. Since the grain pores formed in the grains 110 of the insulation ceramic base 100 are relatively small, it is difficult for the functional ceramic film to be pushed into the grain pores when the functional ceramic film is pressed against the insulation ceramic base 100. On the other hand, the inter-grain pores 122 formed between the grains 110 are relatively large, and thus the surface of the functional ceramic film is somewhat rough. Therefore, the functional ceramic film can be pushed into the pores 122 by pressing, thereby increasing physical bonding strength between the insulation ceramic base 100 and the functional ceramic film.

When the insulation ceramic base 100 has an extremely plain surface and the functional ceramic film is pressed against the insulation ceramic base 100 for bonding, the bonding strength between the insulation ceramic base 100 and the functional ceramic film depends on the binder of the functional ceramic film. However, when the surface of the insulation ceramic base 100 is somewhat rough owing to the inter-grain pores 122 formed between the grains 110, the functional ceramic film is pushed into the pores 122 by pressing. Therefore, the functional ceramic film can be more firmly bonded to the insulation ceramic base 100 owing to this anchoring structure as well as the bonding force by the binder of the functional ceramic film.

This anchoring structure prevents the functional ceramic film from shrinking in a length (x-axis) direction and in a width (y-axis) direction. Furthermore, owing to the anchoring structure, the diffusion bonding layer 150 can be formed at a more wide area between the insulation ceramic base 100 and the functional ceramic sheet 200, thereby increasing chemical bonding strength between the insulation ceramic base 100 and the functional ceramic sheet 200.

This anchoring effect can be improved by the following method. The insulation ceramic base 100 can be surface treated. For example, the surface of the insulation ceramic base 100 can be polished to increase surface roughness, or grooves can be formed to a predetermined length at predetermined intervals in the surface of the insulation ceramic base 100. Further, the insulation ceramic base 100 can be chemically etched using acid or plasma to enlarge the inter-grain pores 122.

As explained above, the functional ceramic sheet 200 is firmly bonded to the insulation ceramic base 100 by the binder included in the functional ceramic sheet 200 (physical bonding), the diffusion bonding layer 150 (chemical bonding), and the anchoring structure. In addition, an intermediate material can be used to increase the bonding strength between the functional ceramic sheet 200 and the insulation ceramic base 100. A single metal oxide or a composition of several metal oxides can be used as the intermediate material. The intermediate material is properly selected such that it can be transferred into both the insulation ceramic base 100 and the functional ceramic sheet 200 by solid diffusion to form a diffusion bonding layer.

The firing conditions of the functional ceramic film for forming the functional ceramic sheet 200 are properly selected to prevent deteriorating the characteristics of the functional ceramic sheet 200. For example, (Pr based) ceramic materials for a varistor may be fired in the temperature range from 1100 to 1250° C. for 1 to 3 hours in the atmosphere. Depending on the composition ratio, ceramic materials for an NTC thermistor may be fired in the temperature range from 950 to 1350° C. for 1 to 3 hours in the atmosphere. In the case of magnetic ceramic materials, the temperature and atmosphere gas of a firing operation can be adjusted according to the composition of the magnetic materials. For example, Ni—Cu—Zn based ferrite materials can be fired in the temperature range from 900 to 1100° C. for 1 to 3 hours in the atmosphere, and Mn—Zn based ferrite materials can be fired in the temperature range from 1100 to 1400° C. for 1 to 3 hours in a reducing atmosphere, in order to obtain desired electric characteristics.

Depending on the type of a final product, the functional ceramic sheet 200 attached to the insulation ceramic base 100 may include a dielectric ceramic material, a magnetic ceramic material, a piezoelectric ceramic material, or a semiconductor ceramic material. Further, prior to forming of the functional ceramic sheet 200 on the insulation ceramic base 100, the insulation ceramic base 100 can be previously fired under conditions that are varied according to the material included in the functional ceramic sheet 200.

In a few words, the functional ceramic paste is printed and dried to form the functional ceramic film on the insulation ceramic base 100. Next, the functional ceramic film is pressed against the insulation ceramic base 100 under isothermal and isobaric conditions to physically bond the functional ceramic film to the insulation ceramic base 100. Then, binder burn-out and firing processes are performed to convert the functional ceramic film into the functional ceramic sheet 200. During these processes, functional oxide materials transfer from the functional ceramic film into the insulation ceramic base 100 by solid diffusion, thereby forming the diffusion bonding layer 150. Owing to the diffusion bonding layer 150, the functional ceramic sheet 200 can be reliably bonded to the insulation ceramic base 100.

Figure 3:
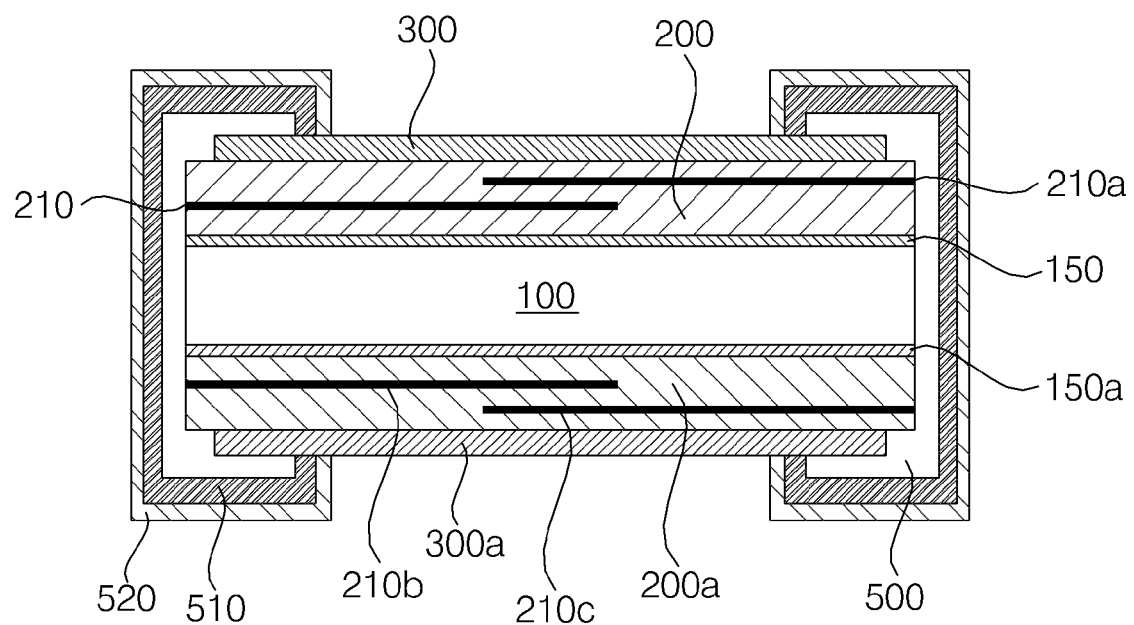
FIG. 3 is a cross-sectional view illustrating a multifunctional ceramic component according to another embodiment of the present invention.

FIG. 3 is a cross-sectional view illustrating a multifunctional ceramic component according to another embodiment of the present invention.

Referring to FIG. 3, the ceramic component of the current embodiment includes: an insulation ceramic base 100; first and second functional ceramic sheets 200 and 200a having different electrical characteristics and respectively bonded to both sides of the insulation ceramic base 100 by diffusion bonding layers 150 and 150a; a pair of internal electrodes 210 and 210a embedded in the first functional ceramic sheet 200; another pair of internal electrodes 210b and 210c embedded in the second functional ceramic sheet 200a; external electrodes 500 electrically connected to exposed portions of the internal electrodes 210, 210a, 210b, and 210c; and plating layers 510 and 520 formed on the external electrodes 500. Optionally, protection layers 300 and 300a can be formed on the first and second functional ceramic sheets 200 and 200a, respectively, so as to cover the first and second functional ceramic sheets 200 and 200a.

In the current embodiment, different functional ceramic pastes are formed into functional ceramic films through printing and drying, and the first and second functional ceramic sheets 200 and 200a are formed using the functional ceramic films by firing. If firing conditions for the functional ceramic films are similar, the functional ceramic films can be simultaneously fired.

However, firing temperatures for the functional ceramic films are different, one of the functional ceramic films requiring a higher firing temperature is first formed and fired, and then the other is formed and fired. Therefore, electrical characteristics of a functional ceramic sheet requiring a relatively low firing temperature can be protected.

In the case where the functional ceramic sheets are fired in the atmosphere and a reducing atmosphere, respectively, it should be previously studied how the electrical characteristics of the functional ceramic sheets are changed.

Figure 4:
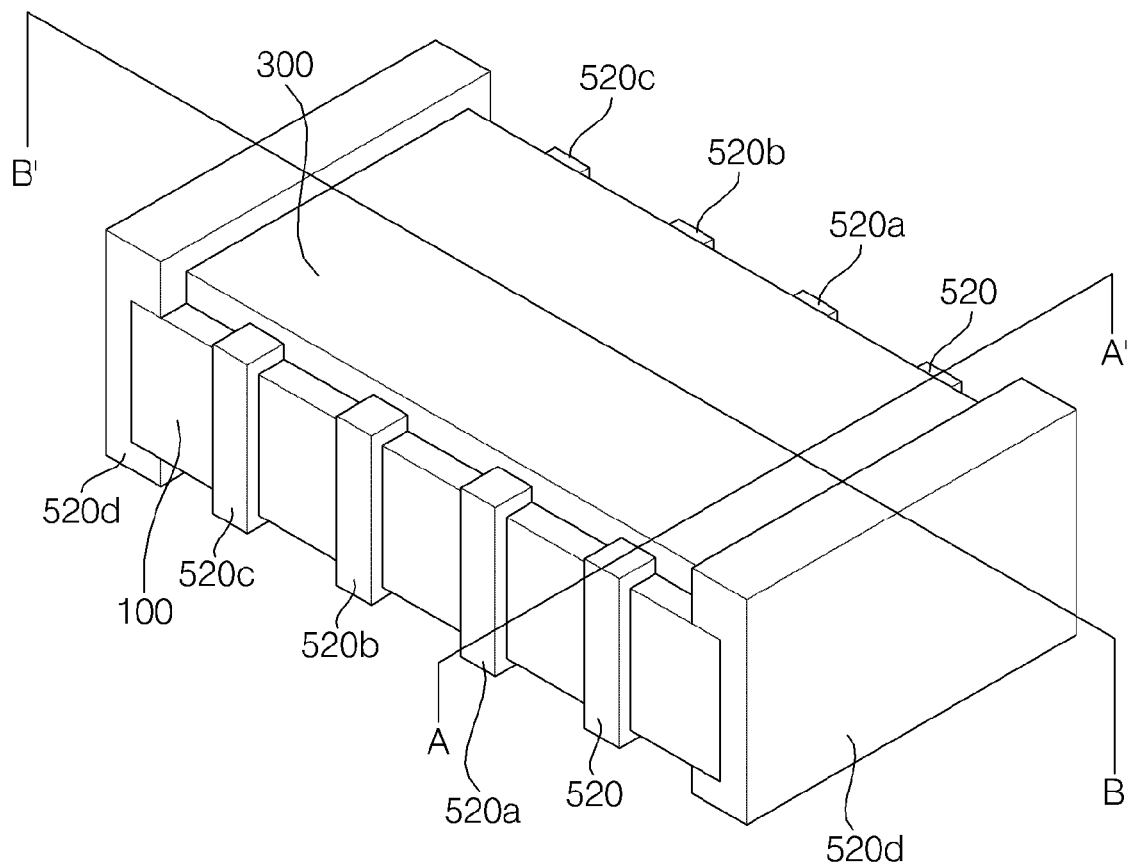
FIGS. 4 through 6 are views illustrating a multifunctional ceramic component including a plurality of columns according to another embodiment of the present invention.
Figure 5:
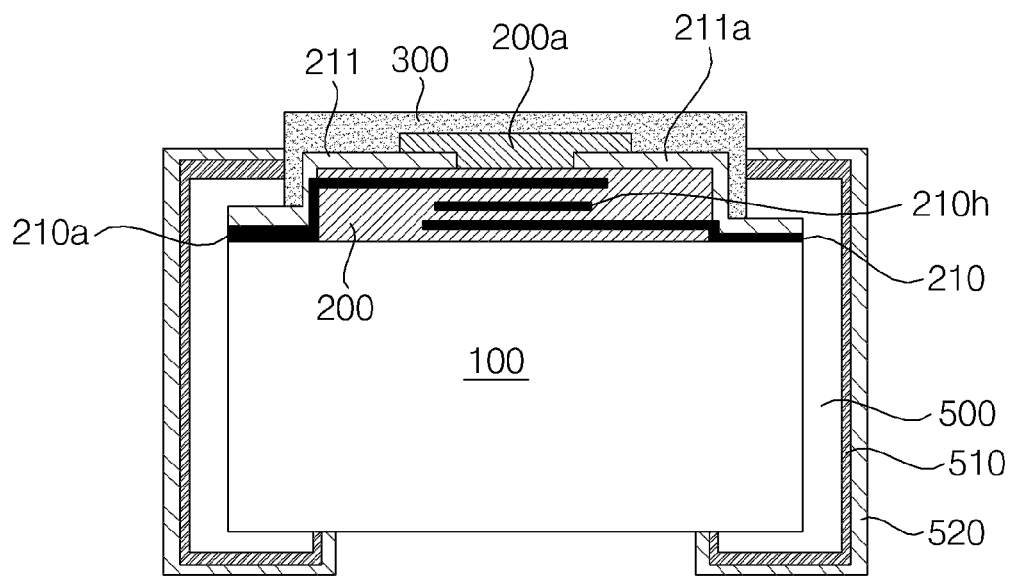
Figure 6:
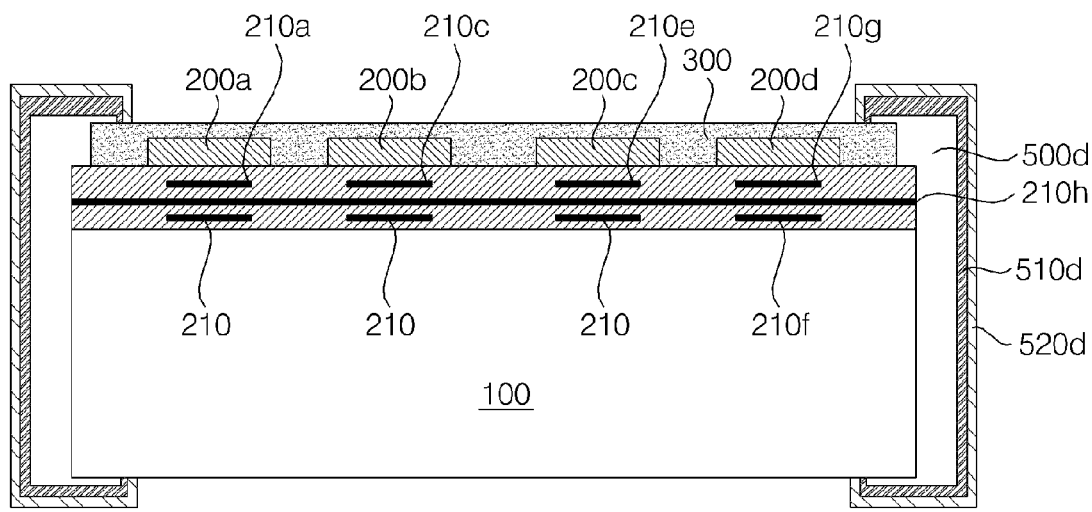

FIG. 4 is a perspective view illustrating a multifunctional ceramic component, and FIGS. 5 and 6 are sectional views taken along line A-A' and B-B' of FIG. 4, respectively.

Referring to FIGS. 4 to 6, a first functional ceramic sheet 200 is bonded to an insulation ceramic base 100 by a diffusion bonding layer 150, and four pairs of internal electrodes 210, 210a, 210b, 210c, 210d, 210e, 210f, and 210g are embedded in the first functional ceramic sheet 200 together with a common internal electrode 210h. Further, another four pairs of electrodes 211, 211a, 211b, 211c, 211d, 211e, 211f, and 211g (only the electrodes 211 and 221a are shown in FIG. 5) are formed from a top surface of the first functional ceramic sheet 200 to the functional ceramic base 100. A second functional ceramic sheet 200a is formed on the top surface of the first functional ceramic sheet 200 in electrical connection with the four pairs of electrodes 211, 211a, 211b, 211c, 211d, 211e, 211f, and 211g. A protection layer 300 covers the first and second functional ceramic sheets 200 and 200a. Exposed portions of the electrodes 210, 210a, 210b, 210c, 210d, 210e, 210f, 210g, 211, 211a, 211b, 211c, 211d, 211e, 211f, and 211g are connected to external electrodes 500, 500a, 500b, and 500c (only the external electrode 500 is shown in FIG. 5). Exposed portions of the common internal electrode 210h are connected to external electrodes 500d. Optionally, external electrodes 500, 500a, 500b, 500c, and 500d can be covered with a nickel plating layer 510 and a tin plating layer 520.

In the embodiment of FIGS. 4 to 6, the first functional ceramic sheet 200 can be used as a varistor, and the second functional ceramic sheet 200a can be used as an electrical resistor so as to provide a multifunctional component having functions of a static discharger and an electromagnetic interference (EMI) filter.

Furthermore, the first functional ceramic sheet 200 can be used as an NTC thermistor, and the second functional ceramic sheet 200a can be used as an electrical resistor so as to provide a linear thermistor array having a resistance varying in linear proportion to temperature.

The internal electrodes 210 through 210h and 211 through 211g can be formed of a paste by screen printing, sputtering, or transferring using a predetermined pattern. The paste may include 40 to 80 weight % of metallic solid matter, and the metallic solid matter may include one of precious metals such as silver (Ag)-palladium (Pd), palladium (Pd), platinum (Pt), gold (Au), and silver (Ag), or one of nickel (Ni), copper (Cu), and tungsten (W).

The above-described embodiments of the present invention provide the following advantages.

The insulation ceramic base is previously prepared through a firing process, and then the functional ceramic paste is applied to one or both sides of the insulation ceramic base and dried to form a functional ceramic film. Thereafter, the functional ceramic film is pressed against the insulation ceramic base under isothermal and isobaric conditions to physically bond the functional ceramic film to the insulation ceramic base by softening the binder included in the functional ceramic film and pushing the softened binder into the insulation ceramic base through the grain pores and the inter-grain pores of the insulation ceramic base. Furthermore, when the functional ceramic film is pressed, some portions of the functional ceramic film are pushed into tiny recesses formed on the insulation ceramic base such that the functional ceramic film can be physically bonded to the insulation ceramic base more tightly. Then, the functional ceramic film is densified and converted into the functional ceramic sheet by firing. During the firing operation, functional oxides included in the functional ceramic film are transferred into the insulation ceramic base by solid diffusion and chemically react with the insulation ceramic base to form the diffusion bonding layer. Therefore, the functional ceramic sheet can be firmly bonded to the insulation ceramic base.

Further, the previously prepared insulation ceramic base can be surface treated. For example, the surface of the insulation ceramic base can be polished to increase surface roughness, or grooves can be formed to a predetermined length at predetermined intervals in the surface of the insulation ceramic base. Further, the insulation ceramic base can be chemically etched using acid or plasma. After the insulation ceramic base is surface treated, the functional ceramic paste can be printed and dried on the functional ceramic base to form the functional ceramic film. Then, the functional ceramic film can be pressed and fired to form the functional ceramic sheet. In this case, since the functional ceramic film is fired after some portions of the functional ceramic film are pushed into the surface of the insulation ceramic base by the pressing action, the functional ceramic sheet can be bonded to the insulation ceramic base more firmly owing to this anchoring structure. In addition, this anchoring structure prevents the functional ceramic sheet from shrinking in left and right directions during the firing, and the surface treatment preformed on the insulation ceramic base increases the contact surface between the functional ceramic film and the insulation ceramic base and thus increases the possibility of solid diffusion.

Furthermore, since the thin functional ceramic sheet is pressed at a constant pressure and temperature, the functional ceramic sheet can receive sufficient pressure, and thus the flatness of the functional ceramic sheet increases. Then, the functional ceramic sheet is converted into the functional ceramic sheet by firing, such that the thickness deviation of the functional ceramic sheet can be reduced and thus the degree of scattering of the electric characteristics of the functional ceramic sheet can be reduced.

Furthermore, since the functional ceramic sheet can have a uniform roughness, another functional component can be formed on the functional ceramic sheet. Therefore, a multifunctional ceramic component can be provided.

In addition, mechanical bending strength can be significantly increased. That is, since the insulation ceramic base is previously prepared by high temperature firing, sufficient mechanical strength can be obtained although the functional ceramic sheet is very thin.

Moreover, manufacturing costs can be largely reduced since the functional ceramic sheet made up of expensive metal oxide materials is formed only on a predetermined region of the functional ceramic base to a thin thickness of an active layer having electrical characteristics. The raw material costs can be reduced by at least 25% when compared with the conventional chip stacking process.

A method of manufacturing a functional ceramic component will now be described according to the present invention.

Figure 7:
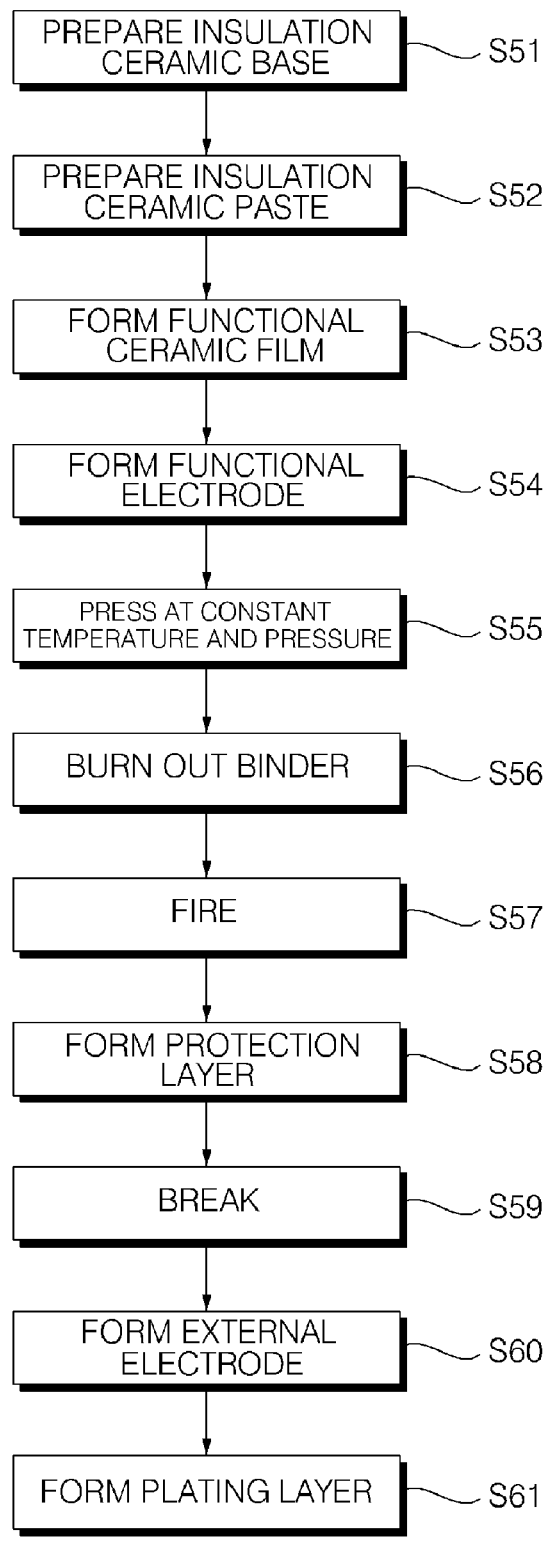
FIG. 7 is a flowchart for explaining a method of manufacturing a ceramic component like that depicted in FIG. 1, according to an embodiment of the present invention.

FIG. 7 is a flowchart for explaining a method of manufacturing a ceramic functional component like that depicted in FIG. 1, according to an embodiment of the present invention, and FIGS. 8A to 8H are views corresponding to operations of the method of FIG. 7.

Figure 8:
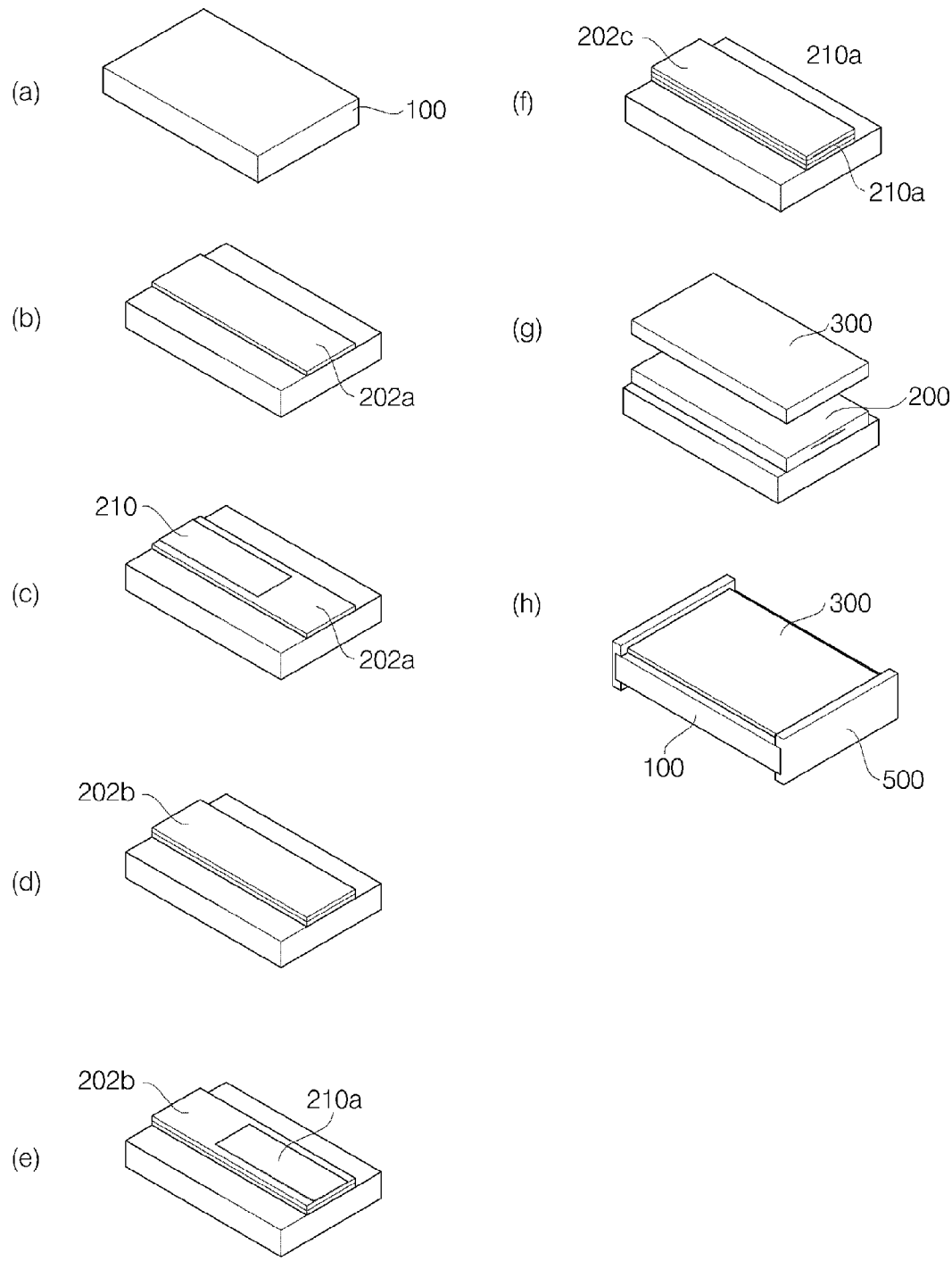
FIGS. 8A through 8H are views corresponding to operations of the method of FIG. 7.

Referring to FIGS. 7 and 8A, in operation S51, an insulation ceramic base 100 fired at a predetermined temperature is previously prepared. A single ceramic component is mainly stated in the following description; however, in an actual process, a number of ceramic components are formed from a single insulation ceramic base wafer (for example, having a size of 60×50×0.25 mm) divided into a number of regions corresponding to the ceramic components by scribing lines.

As explained above, the insulation ceramic base 100 can be formed of an alumina or aluminum nitride. In the current embodiment, an alumina base having 96 degree of purity or higher and a thickness of 250 μm±5 μm is used.

In operation S52, functional ceramic paste is prepared. The functional ceramic paste includes 40 to 80 weight % of functional ceramic powder and 20 to 40 weight % of a binder solution. The functional ceramic powder includes a zinc oxide as a main ingredient for exhibiting varistor characteristics. A praseodymium oxide, a cobalt oxide, and a neodymium oxide are included in the functional ceramic powder as additives. The binder solution includes 10 to 35 weight % of polyvinylbutyral (PVB) as binder solid matter, 10 to 25 weight % of dioctyl phthalate (DOP) as a plasticizer, 40 to 70 weight % of alpha-terpineol as a solvent, and 1 weight % of castor oil as a lubricant.

Referring to FIGS. 7 and 8B, a functional ceramic film 202a is formed on the insulation ceramic base 100 to a predetermined thickness in operation S53.

The thickness of the functional ceramic film 202a should have at least 10 μm since the insulation ceramic base 100 formed of alumina has an uneven roughness due to a variation of grain size. For example, the roughness of the insulation ceramic base 100 may be deviated in the range from 1 to 3 μm. In the following isothermal/isobaric pressing operation and firing operation (described later), the thickness of the functional ceramic film 202a is reduced by 50% or more. During the firing operation, materials are transferred from the functional ceramic film 202a to the insulation ceramic base 100 and chemically react with the insulation ceramic base 100 to form a chemical reaction layer between the functional ceramic film 202a and the insulation ceramic base 100. For example, when the thickness of the functional ceramic film 202a is 10 μm, the functional ceramic film 202a can be formed into a functional ceramic sheet having a thickness less than 5 μm after the firing operation, and the roughness deviation of the insulation ceramic base 100 can be compensated for.

In the current embodiment, the functional ceramic film 202a is formed to a thickness of 25 μm±1 μm by printing the functional ceramic paste on the insulation ceramic base 100 using a 250-mesh stainless steel wire screen having a 10-μm emulsion thickness and drying the printed functional ceramic paste at 125° C. for 5 minutes.

Referring to FIG. 8C, a first internal electrode 210 is formed on the functional ceramic film 202a above the insulation ceramic base 200. Referring to FIG. 8D, a functional ceramic film 202b for an active layer is formed to a thickness of 25 μm±1 μm using the same method as that used for the functional ceramic film 202a. Referring to FIG. 8E, a second internal electrode 210a corresponding to the first internal electrode 210 is formed on the functional ceramic film 202b. That is, the functional ceramic film 202b is formed between the first and second internal electrodes 210 and 210a to a thickness of 25 μm±1 μm as an active layer exhibiting electrical characteristics. Referring to FIG. 8F, a functional ceramic film 202c is formed on the functional ceramic film 202b including the second internal electrode 210a to a thickness of 25 μm±1 μm (operation S54). The second internal electrode 210a is covered with the functional ceramic film 202c such that the second internal electrode 210 is not exposed to the outside. The total thickness of the functional ceramic films 202a, 202b, and 202c and the first and second electrodes 210 and 210a is 83 μm±2 μm.

When the mechanical strength, deformation, and material costs of a final product are considered, the total thickness may be half the thickness of the insulation ceramic base 100 or less.

Thereafter, after the insulation ceramic base 100 (in an actual process, an insulation ceramic base wafer) including the functional ceramic films 202a, 202b, and 202c is mounted on an aluminum plate or an auxiliary member and is hermitically sealed using a vacuum plastic bag, the insulation ceramic base 100 including the functional ceramic films 202a, 202b, and 202c is pressed under a pressure of 6000 psi at a temperature of 80° C. for 15 minutes (isothermal and isobaric pressing) in operation S55.

Table 1 shows total thicknesses of functional ceramic films that are formed according to a first comparison example and a first embodiment of the present invention, respectively, to compare shrinkage characteristics. The functional ceramic films of the first comparison example are fired without an isothermal and isobaric pressing process. The functional ceramic films of the first embodiment are pressed under a pressure of 6000 psi at a temperature of 80° C. for 15 minutes (isothermal and isobaric pressing) and then are fired together with the functional ceramic films of the first comparison example.

Figure 10:
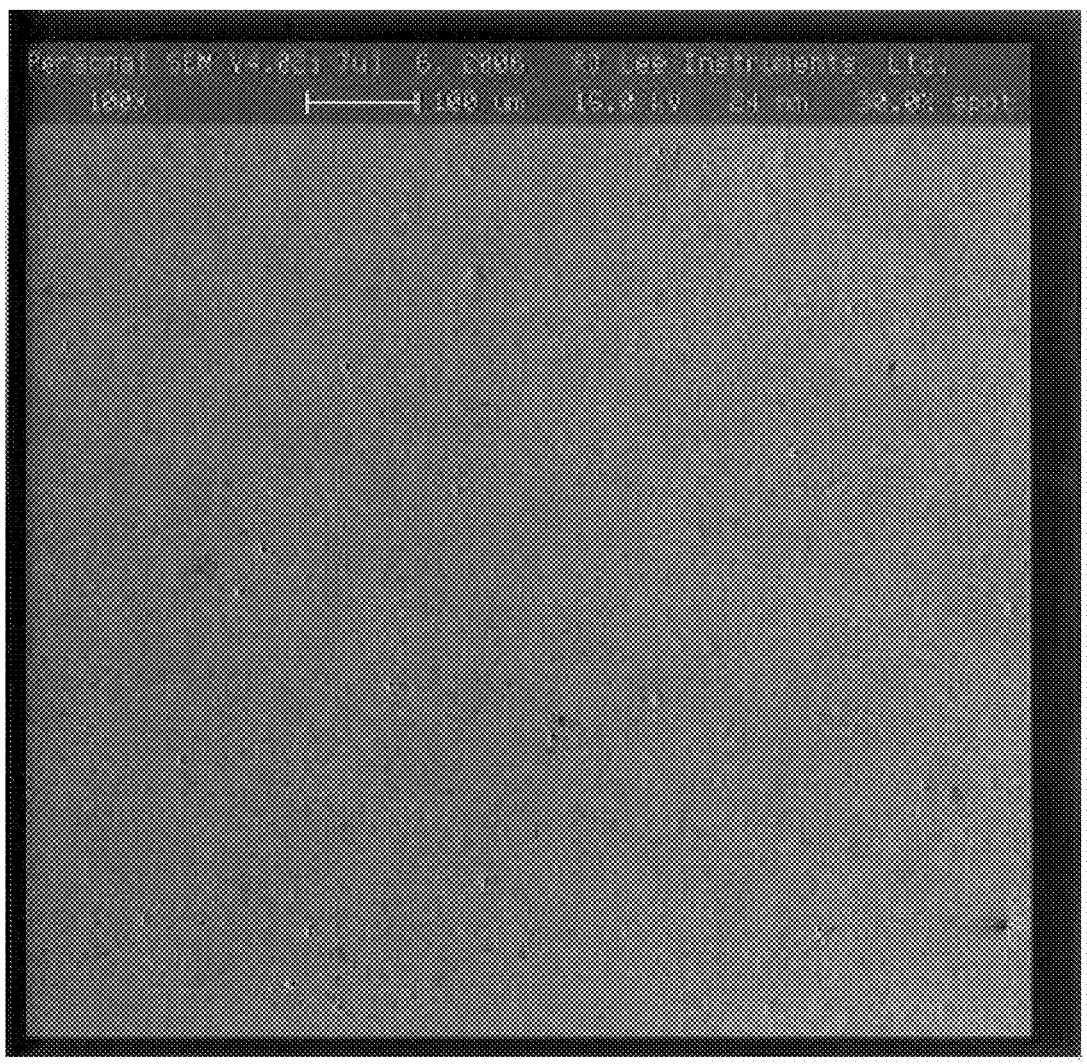

Referring to FIG. 10, the surface of the functional ceramic films of the first embodiment includes much less pores and wrinkles. The reason for this is that the polymer binder included in the functional films is softened and rearranged together with the functional ceramic powder included in the functional ceramic film during the isothermal and isobaric pressing.

Figure 11:
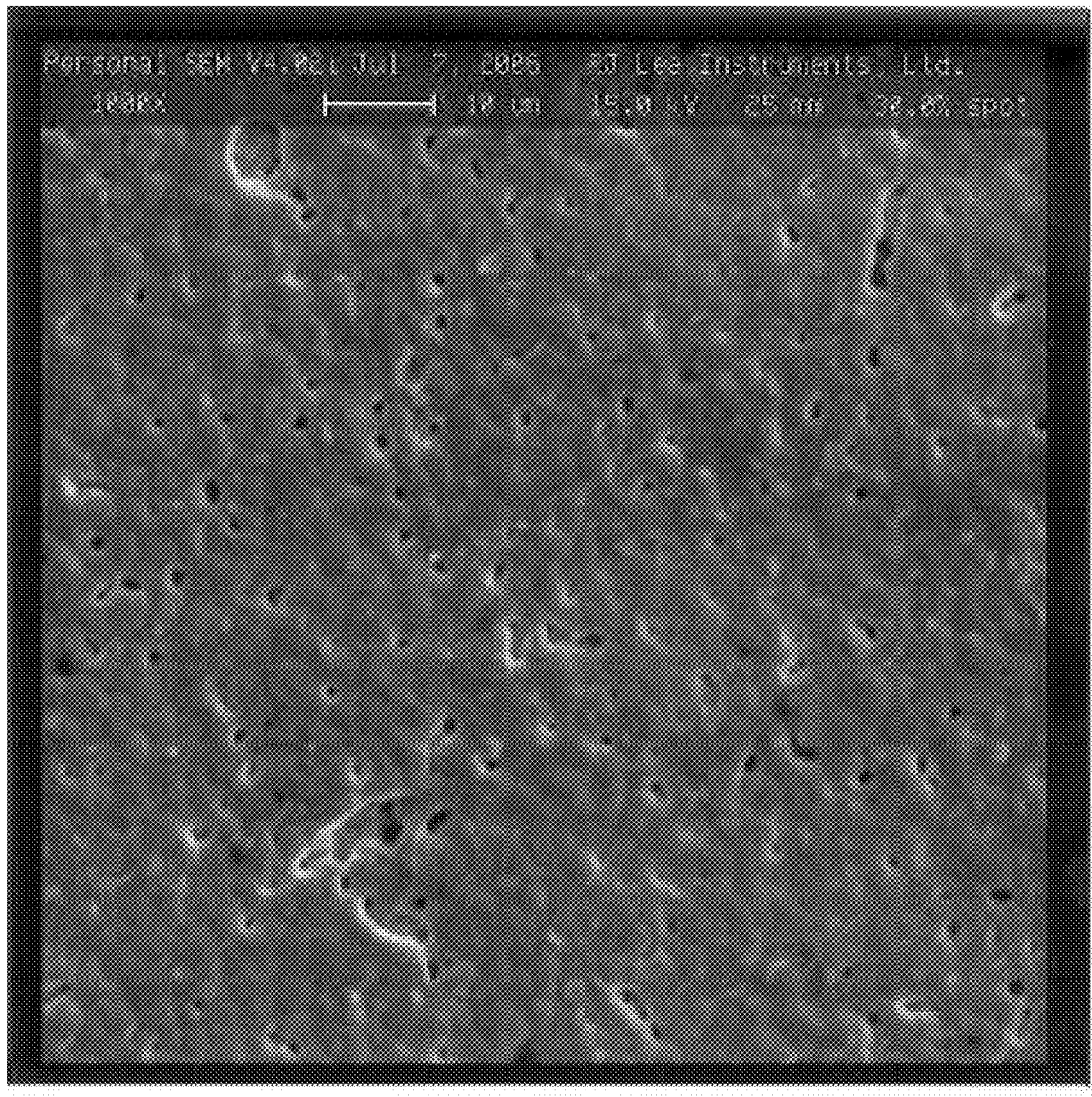
FIGS. 11 and 12 are photographic images illustrating the surfaces of functional ceramic films of the first comparison example and the first embodiment of the present invention after a firing process.
Figure 12:
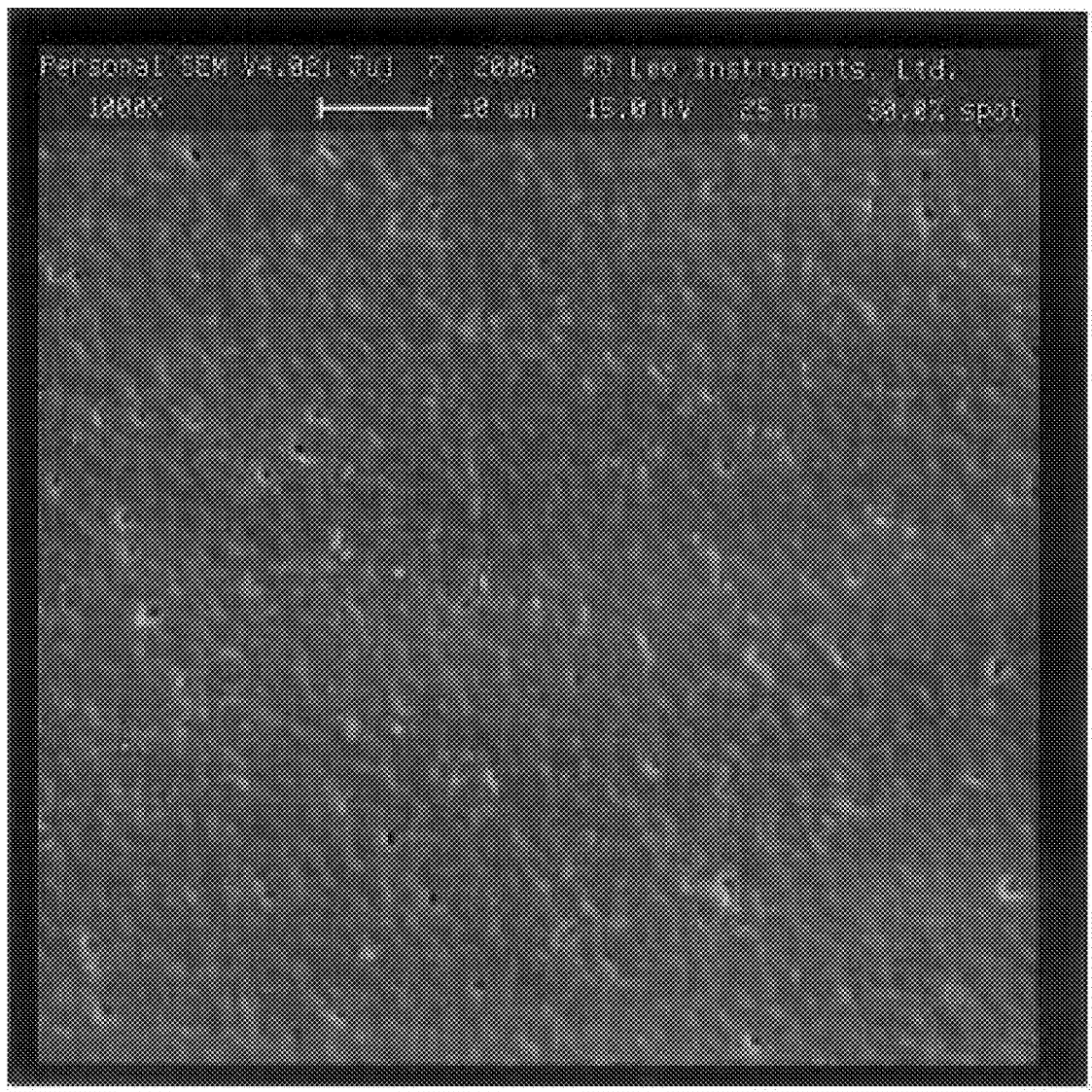

This improvement can be observed from photographic images of FIGS. 11 and 12 in which the surfaces of the functional ceramic films of the first comparison example and of the first embodiment of the present invention are respectively shown. Referring to FIG. 12, uniform particles are densely arranged. However, referring to FIG. 11, a number of pores and wrinkles are observed.

The isothermal and isobaric pressing increases the surface density of the functional ceramic films can be increased and the bonding strength between the functional ceramic films and the insulation ceramic base formed of alumina.

Thereafter, a binder burn-out process is performed at 310° C. for 12 hours to burn out the organic binder included in the pressed functional ceramic films 202a, 202b, and 202c in operation S56.

Referring to FIG. 8G, the pressed functional ceramic films 202a, 202b, and 202c are changed into a functional ceramic

TABLE 1

|  | Printing/drying | After pressing | | After firing | |
| --- | --- | --- | --- | --- | --- |
|  | Functional ceramic film [mm] | Functional ceramic film [mm] | Thickness shrinkage [%] | Functional ceramic film [mm] | Thickness shrinkage [%] |
| Comparision example 1 | 0.080 | — | — | 0.048 | −40.0 |
| Embodiment 1 | 0.083 | 0.072 | −13.3 | 0.041 | −51.4 |

As described above, since the PVB of the binder included in the functional ceramic film 202a contacting the insulation ceramic base 100 has a softening point of 65° C., the functional ceramic powder included in the functional ceramic film 202a can be rearranged and filled into surface and internal pores of the insulation base film 100. Thus, the physical bonding between the functional ceramic film 202a and the insulation ceramic base 100 is affected.

Therefore, after the isothermal and isobaric pressing, the total thickness of the functional ceramic films of the first embodiment was reduced to 72 µm±1 µm by about 13%. Further, after the isothermal and isobaric pressing, the thickness deviation of the functional ceramic films of the first embodiment was reduced from 83 µm±2 µm to 72 µm±µm.

Figure 9:
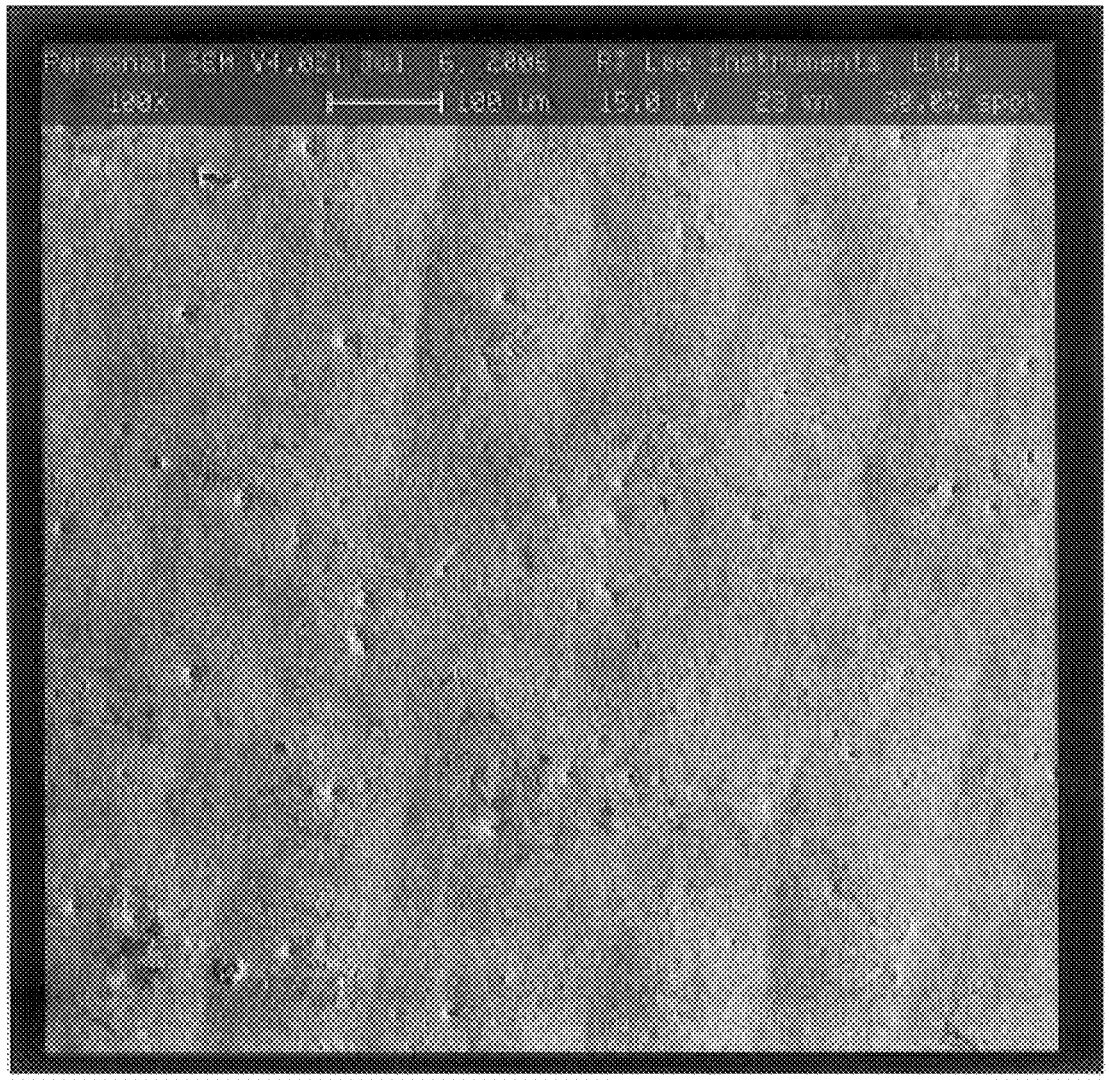
FIGS. 9 and 10 are photographic images illustrating surfaces of functional ceramic films of a first comparison example and a first embodiment of the present invention, respectively.

FIGS. 9 and 10 are photographic images illustrating surfaces of functional ceramic films of the first comparison example and the first embodiment of the present invention, respectively. FIG. 9 shows the surface of the functional ceramic films of the first comparison example before the functional ceramic films are fired, and FIG. 10 shows the surface of the functional ceramic films of the first embodiment before the functional ceramic films are fired.

Referring to FIG. 9, since the functional ceramic films of the first comparison example are not treated by isothermal and isobaric pressing, the surface of the functional ceramic film includes a number of pores. Moreover, the surface of the functional ceramic film of the first comparison example is wrinkled due to screen mesh wires. Wrinkles exist at internal stacked patterns as well as at the surface of the functional ceramic film, causing thickness deviation.

sheet 200 exhibiting electric characteristics through a firing process in operation S57. During the firing process, the metal oxides included in the functional ceramic film 202a is transferred into the insulation ceramic base 100 through the gain pores and inter-gain pores 122 of the insulation ceramic base 100 by solid diffusion caused by thermal energy so as to form a diffusion bonding layer 150 between the functional ceramic sheet 200 and the insulation ceramic base 100. The functional ceramic sheet 200 and the insulation ceramic base 100 can be bonded together more firmly owing to the anchoring structure provided by the diffusion bonding layer 150.

In the current embodiment, the firing process is performed at 1150° C. for 3 hours in consideration of electric characteristics of the functional ceramic sheet 200. After the firing process, the functional ceramic sheet 200 has a uniform thickness of 41 µm±1 µm that is about 50% of the total thickness of the functional ceramic films 202a, 202b, and 202c. The functional ceramic film 202b formed as an active layer is reduced in thickness to 142.2 µm±0.5 µm by about 43%. The functional ceramic films 202a, 202b, and 202c can be sufficiently and uniformly pressed during the isothermal and isobaric pressing process before the firing process since the total thickness of the functional ceramic films 202a, 202b, and 202c is small. Thus, the functional ceramic film 202b forming an active layer can have a good flatness, and the functional ceramic films 202a and 202c forming cover layers can have a good flatness. Therefore, the functional ceramic sheet 200 can have a uniform thickness.

After the firing process, the functional ceramic films 202a, 202b, and 202c are shrunken in thickness by about 50%. This percentage of shrinkage is about twice the percentage of shrinkage (26%) in a manufacturing process of a conventional stacked chip component. The reason for this can be explained as follows. The flatness and density of the functional ceramic films 202a, 202b, and 202c is sufficiently increased since the functional ceramic films 202a, 202b, and 202c can be uniformly pressed during the isothermal and isobaric pressing process. Furthermore, portions of the functional ceramic film 202a inserted into the grain pores and inter-grain pores 122 of the insulation ceramic base 100 prevent the functional ceramic films 202a, 202b, and 202c from shrinking in length and width directions as an anchoring structure. In addition, considerable material transfer occurs in a thickness direction of the functional ceramic films 202a, 202b, and 202c since the portions of the functional ceramic film 202a are inserted into the grain pores and inter-grain pores 122.

After the firing process, as shown in FIG. 8H, a protection layer 300 is formed to completely cover the functional ceramic sheet 200 in operation S58.

The protection layer 300 is necessary when the functional ceramic sheet 200 has semiconductor characteristics. However, for example, when the functional ceramic sheet 200 has dielectric, piezoelectric, or magnetic characteristics, the protection layer 300 cannot be formed.

The protection layer 300 is formed of a material having stable electric insulation, chemical-resistant, moisture-resistant, and heat-resistant characteristics. When the protection layer 300 is formed of a glass material, a screen printing method or a dispensing method can be used. Furthermore, when the protection layer 300 is formed of a polymer, vacuum thermal deposition or dipping can be used.

After that, in operation S59, the insulation ceramic base wafer is divided into individual chips by breaking it along scribing lines. In operation S60, external electrodes 500 are formed by a typical method.

In detail, the external electrodes 500 can be formed by applying external electrode paste such as silver or silver-epoxy paste to both ends of the individual ceramic component using a dipping method so as to cover the internal electrodes 210 and 210a exposed at the both ends.

The breaking of the insulation ceramic base wafer can be performed using various methods, and the forming of the external electrodes 500 can be performed using various methods. For example, like in a chip resistor manufacturing process, the external electrodes 500 can be formed after the insulation ceramic base wafer is primarily broken, and then the insulation ceramic base wafer can be secondly divided into individual chips.

Thereafter, optionally, nickel plating layers 510 and zinc plating layers 520 (refer to FIG. 3) can be formed sequentially formed on the external electrodes 500 in operation S61.

Tables 2 and 3 show results of electric characteristic and reliability tests performed on samples prepared according to the first comparison example and the first embodiment of the present invention.

TABLE 2

| | Thickness | | Contact ESD Test [+/−8 kV, 10 times] | | | | | | Lead heat-resistance [260° C., 10 sec, dipping in lead bath] | | | | |
|---|---|---|---|---|---|---|---|---|---|---|---|---|---|
| | Active | Final | Early valve | | | Latter value | | | Early valve | | | Latter value | |
| No | layer [μm] | product [mm] | Cp [pF] | DF [%] | Vb [V] | Vb [V] | ΔV [%] | No | Cp [pF] | DF [%] | Vb [V] | Vb [V] | ΔV [%] |
| 1 | 15.8 | 0.455 | 41.3 | 10.3 | 16.5 | 10.3 | −37.5 | 1 | 40.1 | 10.4 | 18.5 | 17.7 | −4.3 |
| 2 | 15.6 | 0.450 | 41.7 | 10.6 | 17.9 | 11.8 | −34.1 | 2 | 35.8 | 10.2 | 22.9 | 21.4 | −6.6 |
| 3 | 14.2 | 0.449 | 37.3 | 10.5 | 19.8 | 10.8 | −45.5 | 3 | 41.2 | 10.5 | 18.3 | 17.3 | −5.5 |
| 4 | 15.6 | 0.452 | 41.5 | 10.6 | 18.0 | 9.5 | −47.2 | 4 | 38.1 | 10.6 | 19.2 | 18.4 | −4.2 |
| 5 | 15.7 | 0.454 | 41.0 | 10.6 | 18.4 | 10.2 | −44.6 | 5 | 39.6 | 10.6 | 18.4 | 17.8 | −3.3 |
| 6 | 15.2 | 0.445 | 42.4 | 10.4 | 17.4 | 8.2 | −52.9 | 6 | 39.2 | 10.3 | 17.4 | 16.9 | −2.9 |
| 7 | 15.1 | 0.454 | 43.4 | 10.1 | 16.8 | 9.6 | −42.9 | 7 | 37.9 | 10.4 | 19.8 | 19.1 | −3.5 |
| 8 | 16.0 | 0.461 | 40.2 | 10.9 | 18.3 | 11.2 | −38.8 | 8 | 39.0 | 10.2 | 18.2 | 17.0 | −6.6 |
| 9 | 15.1 | 0.446 | 41.7 | 10.5 | 18.2 | 9.6 | −47.3 | 9 | 40.6 | 10.5 | 17.9 | 16.6 | −7.3 |
| 10 | 18.8 | 0.456 | 37.6 | 10.4 | 19.4 | 10.3 | −46.9 | 10 | 36.8 | 10.4 | 19.4 | 18.1 | −6.7 |
| 11 | 17.2 | 0.453 | 39.2 | 10.6 | 18.3 | 11.4 | −37.7 | 11 | 43.5 | 10.6 | 16.3 | 15.1 | −7.4 |
| 12 | 18.4 | 0.450 | 36.2 | 10.4 | 22.1 | 16.2 | −26.7 | 12 | 36.5 | 10.1 | 22.3 | 21.9 | −1.8 |
| 13 | 18.2 | 0.452 | 38.4 | 10.5 | 19.2 | 12.3 | −35.9 | 13 | 37.3 | 10.5 | 19.2 | 19.1 | −0.5 |
| 14 | 15.2 | 0.452 | 42.3 | 10.5 | 17.2 | 16.3 | −5.2 | 14 | 39.7 | 10.2 | 18.3 | 17.4 | −4.9 |
| 15 | 18.3 | 0.455 | 37.5 | 10.4 | 19.4 | 14.3 | −26.3 | 15 | 34.8 | 10.4 | 24.5 | 22.4 | −8.6 |
| 16 | 18.8 | 0.449 | 36.5 | 10.2 | 22.8 | 13.6 | −40.4 | 16 | 37.3 | 10.3 | 19.3 | 18.3 | −5.2 |
| 17 | 17.9 | 0.456 | 38.7 | 10.4 | 19.5 | 16.5 | −15.4 | 17 | 40.7 | 10.4 | 18.5 | 17.6 | −4.9 |
| 18 | 15.6 | 0.450 | 40.7 | 10.3 | 18.7 | 15.8 | −15.5 | 18 | 44.4 | 10.3 | 15.7 | 14.8 | −5.7 |
| 19 | 18.9 | 0.445 | 35.4 | 10.6 | 23.4 | 16.0 | −31.6 | 19 | 37.6 | 10.5 | 19.4 | 18.8 | −3.1 |
| 20 | 15.1 | 0.451 | 41.4 | 10.3 | 16.5 | 14.4 | −12.7 | 20 | 39.3 | 10.3 | 18.5 | 17.9 | −3.2 |
| Avg | 16.5 | 0.452 | 39.7 | 10.5 | 18.9 | 12.4 | −34.2 | Avg | 39.0 | 10.4 | 19.1 | 18.2 | −4.8 |
| Min | 14.2 | 0.445 | 35.4 | 10.1 | 16.5 | 8.2 | −52.9 | Min | 34.8 | 10.1 | 15.7 | 14.8 | −8.6 |
| Max | 18.9 | 0.461 | 43.4 | 10.9 | 23.4 | 16.5 | −5.2 | Max | 44.4 | 10.6 | 24.5 | 22.4 | −0.5 |
| Stdev | 1.6 | 0.0040 | 2.4 | 0.2 | 1.9 | 2.7 | 13.3 | Stdev | 2.4 | 0.1 | 2.1 | 2.0 | 2.0 |

TABLE 3

| | Thickness | | Contact ESD Test | | | | | | Lead heat-resistance | | | | |
| | | | | +/−8 kV, 10 times | | | +/−15 kV, 10 times | | | [260° C., 10 sec, dipping in lead bath] | | | |
| | Active | Final | Early valve | | | Latter value | | Latter value | | | Early valve | | | Latter value | |
| No | layer [μm] | product [mm] | Cp [pF] | DF [%] | Vb [V] | Vb [V] | ΔV [%] | Vb [V] | ΔV [%] | No | Cp [pF] | DF [%] | Vb [V] | Vb [V] | ΔV [%] |
|---|---|---|---|---|---|---|---|---|---|---|---|---|---|---|---|
| 1 | 14.5 | 0.445 | 39.0 | 5.8 | 18.2 | 18.2 | 0.0 | 18.0 | −1.1 | 1 | 38.4 | 6.1 | 18.5 | 18.4 | −0.5 |
| 2 | 14.2 | 0.444 | 39.9 | 6.1 | 17.9 | 17.9 | 0.0 | 18.8 | 4.6 | 2 | 39.2 | 5.9 | 18.4 | 18.4 | 0.0 |
| 3 | 14.6 | 0.445 | 40.5 | 6.0 | 17.6 | 17.5 | −0.6 | 18.4 | 4.4 | 3 | 39.6 | 6.2 | 18.3 | 18.1 | −1.1 |
| 4 | 14.2 | 0.445 | 39.7 | 6.1 | 18.0 | 18.0 | 0.0 | 18.3 | 1.7 | 4 | 38.9 | 6.3 | 18.2 | 18.2 | 0.0 |
| 5 | 14.8 | 0.445 | 39.2 | 6.1 | 18.4 | 18.3 | −0.5 | 18.8 | 2.1 | 5 | 39.2 | 6.3 | 18.4 | 18.3 | −0.5 |
| 6 | 14.4 | 0.443 | 40.6 | 5.9 | 17.8 | 17.6 | −1.1 | 18.2 | 2.1 | 6 | 39.5 | 6.0 | 17.4 | 17.2 | −1.1 |
| 7 | 14.2 | 0.445 | 39.4 | 5.6 | 18.1 | 18.0 | −0.6 | 18.3 | 1.1 | 7 | 40.6 | 6.1 | 17.5 | 17.5 | 0.0 |
| 8 | 14.4 | 0.444 | 38.4 | 6.4 | 18.8 | 18.6 | −1.1 | 18.9 | 0.3 | 8 | 39.0 | 5.9 | 18.2 | 18.0 | −1.1 |
| 9 | 14.5 | 0.444 | 39.2 | 6.0 | 18.4 | 18.3 | −0.5 | 19.3 | 4.7 | 9 | 40.6 | 6.2 | 17.9 | 17.6 | −1.7 |
| 10 | 14.5 | 0.445 | 39.6 | 5.9 | 18.1 | 18.0 | −0.6 | 18.9 | 4.2 | 10 | 39.0 | 6.1 | 18.4 | 18.3 | −0.5 |
| 11 | 14.2 | 0.442 | 38.9 | 6.1 | 18.3 | 18.2 | −0.5 | 18.2 | −0.3 | 11 | 39.9 | 6.3 | 18.5 | 18.1 | −2.2 |
| 12 | 14.7 | 0.445 | 39.2 | 5.9 | 18.4 | 18.3 | −0.5 | 18.5 | 0.6 | 12 | 40.5 | 5.8 | 17.8 | 17.7 | −0.6 |
| 13 | 14.5 | 0.444 | 40.1 | 6.0 | 17.7 | 17.5 | −1.1 | 17.6 | −0.3 | 13 | 39.7 | 6.2 | 18.2 | 18.1 | −0.5 |
| 14 | 14.3 | 0.443 | 40.5 | 6.0 | 17.8 | 17.7 | −0.6 | 18.5 | 3.6 | 14 | 39.2 | 5.9 | 18.3 | 18.2 | −0.5 |
| 15 | 14.4 | 0.444 | 39.2 | 5.9 | 18.4 | 18.4 | 0.0 | 17.9 | −2.6 | 15 | 39.6 | 6.1 | 18.1 | 18.1 | 0.0 |
| 16 | 14.3 | 0.443 | 39.5 | 5.7 | 18.1 | 18.0 | −0.6 | 18.4 | 1.5 | 16 | 38.9 | 6.0 | 17.8 | 17.5 | −1.7 |
| 17 | 14.7 | 0.446 | 40.6 | 5.9 | 17.8 | 17.5 | −1.7 | 17.7 | −0.3 | 17 | 39.2 | 6.1 | 18.5 | 18.3 | −1.1 |
| 18 | 14.6 | 0.442 | 39.4 | 5.8 | 18.1 | 17.9 | −1.1 | 18.2 | 0.7 | 18 | 40.1 | 6.0 | 17.7 | 17.3 | −2.3 |
| 19 | 14.3 | 0.445 | 40.1 | 6.1 | 17.8 | 17.8 | 0.0 | 17.6 | −0.9 | 19 | 39.6 | 6.2 | 18.4 | 18.2 | −1.1 |
| 20 | 14.7 | 0.443 | 39.6 | 5.8 | 18.3 | 18.2 | −0.5 | 19.1 | 4.1 | 20 | 39.3 | 6.0 | 18.5 | 18.2 | −1.6 |
| Avg | 14.5 | 0.444 | 39.6 | 6.0 | 18.1 | 18.0 | −0.6 | 18.4 | 1.5 | Avg | 39.5 | 6.1 | 18.2 | 18.0 | −0.9 |
| Min | 14.2 | 0.442 | 38.4 | 5.6 | 17.6 | 17.5 | −1.7 | 17.6 | −2.6 | Min | 38.4 | 5.8 | 17.4 | 17.2 | −2.3 |
| Max | 14.8 | 0.446 | 40.6 | 6.4 | 18.8 | 18.6 | 0.0 | 19.3 | 4.7 | Max | 40.6 | 6.3 | 18.5 | 18.4 | 0.0 |
| Stdev | 0.2 | 0.0011 | 0.6 | 0.2 | 0.3 | 0.3 | 0.5 | 0.5 | 2.2 | Stdev | 0.6 | 0.1 | 0.3 | 0.4 | 0.7 |

Referring to Tables 2 and 3, since the isothermal and isobaric pressing process was performed on the samples prepared according to the first embodiment of the present invention, the samples of the first embodiment has better electric characteristics and lead heat-resistance as compared with the samples of the first comparison example.

The standard deviations of electrostatic capacity values Cp and varistor voltage values Vb are 0.6 pF and 0.3 V in the first embodiment, and the standard deviations of electrostatic capacity values Cp and varistor voltage values Vb are 2.4 pF and 1.9 V in the first comparison example. That is, the electric capacity and varistor voltages values of the samples of the first embodiment are less deviated as compared with those of the samples of the first comparison example. This can be explained in terms of the thickness of the active layer of the functional ceramic sheet with reference to Tables 2 and 3.

Furthermore, the average of dielectric loss values DF is about 6% in the first embodiment and about 10% in the first comparison example. This difference may be resulted from the density of functional ceramic sheet.

Furthermore, in a lead heat-resistance test performed for evaluating the stability of the functional ceramic sheet against thermal impacts, the samples of the first embodiment has better characteristics as compared with the sample of the first comparison example. The reason for this can be explained as follows. The isothermal and isobaric pressing process performed on the samples of the first embodiment increases the anchoring structure between the functional ceramic sheet and the insulation ceramic base, and the functional oxides included in the functional ceramic film are transferred into the insulation ceramic base by solid diffusion during the firing process to form a chemical reaction layer (diffusion bonding layer).

In an electrostatic discharge test, the samples of the first embodiment are much more different from the samples of the first comparison example. In a contact discharge ±15 kV test, the samples of the first embodiment processed through the isothermal and isobaric pressing process are stably varied in varistor voltage by 4.7% to −2.6% (i.e., varied by ±5% or less). However, the samples of the first comparison example are varied in varistor voltage by much more than ±10% (reference variation value for a varistor test) even in a contact discharge ±8 kV test.

The samples of the first embodiment of the present invention have good electric and lead heat-resistant characteristics. The reason for this can be explained as follows. The functional ceramic films are more firmly attached to the insulation ceramic base formed of alumina by the isothermal and isobaric pressing process. Thus, during the firing process after the isothermal and isobaric pressing process, the density of the functional ceramic sheet is increased, and the functional ceramic sheet is chemically reacted with the insulation ceramic base more actively.

Figure 13:
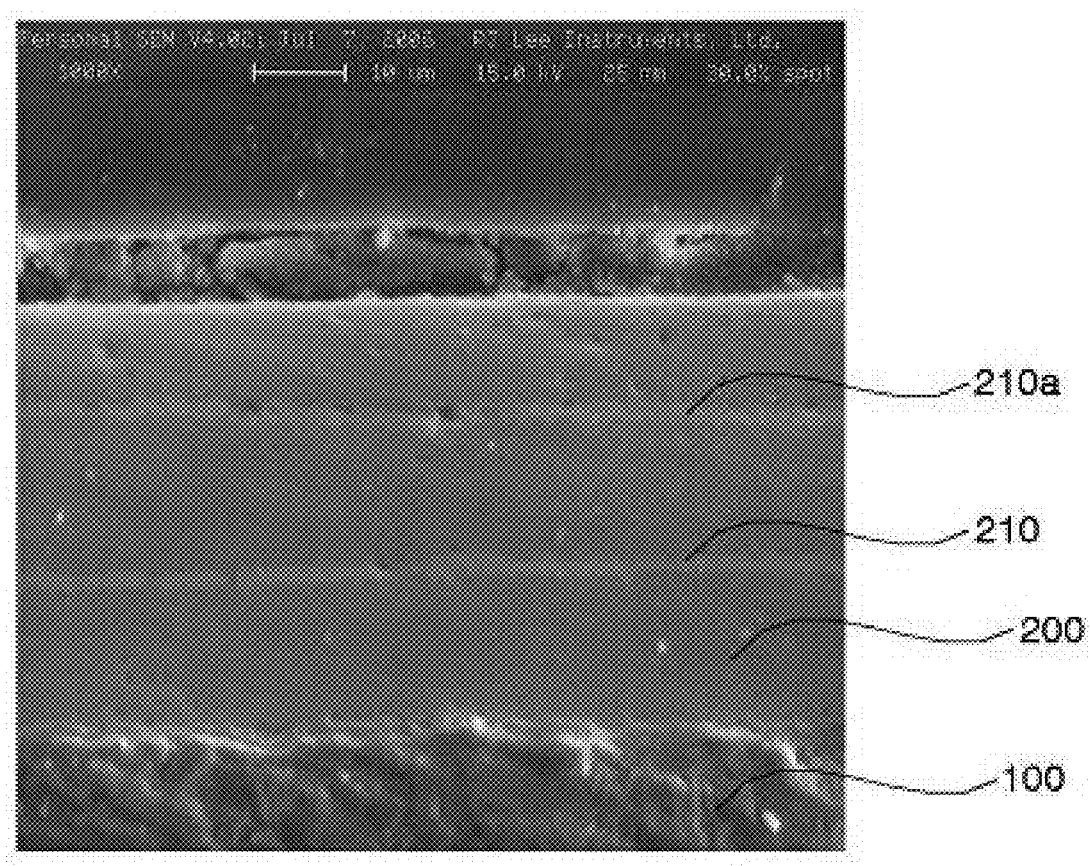
FIGS. 13 and 14 are photographic images illustrating sections of functional ceramic sheet of the first comparison example and the first embodiment of the present invention, respectively.
Figure 14:
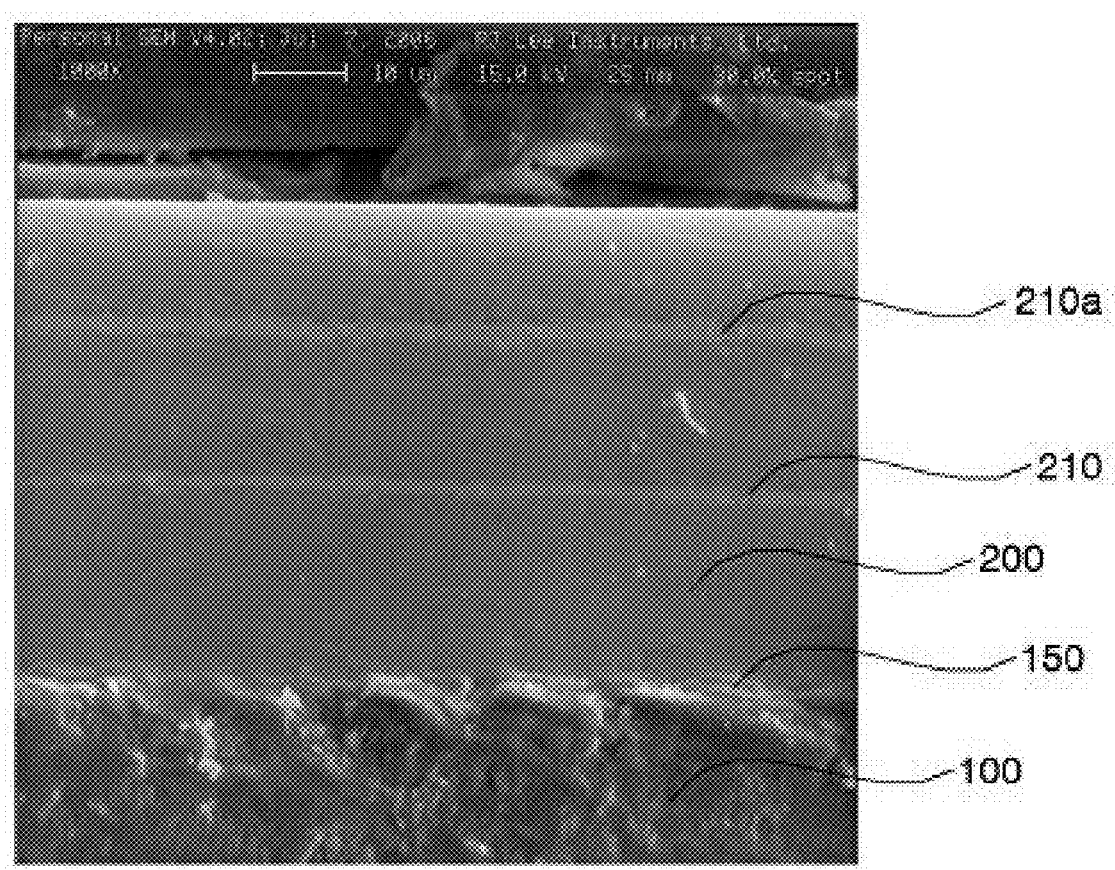

FIGS. 13 and 14 are photographic images illustrating sections of functional ceramic sheet of the first comparison example and the first embodiment of the present invention, respectively. Referring to FIGS. 13 and 14, a number of pores are formed in the functional ceramic sheet of the first comparison example, and thus the functional ceramic sheet of the first comparison example may have a density lower than that of the functional ceramic sheet of the first embodiment. The density reduction may deteriorate thermal and electric characteristics and electrostatic discharge absorption ability of the functional ceramic sheet.

What is claimed is:

1. A ceramic component comprising:
a previously fired insulation ceramic base;
a functional ceramic sheet bonded to a surface of the insulation ceramic base by a diffusion bonding layer having an anchoring structure;
a pair of internal electrodes embedded into the functional ceramic sheet; and
external electrodes electrically connected to the internal electrodes,
wherein a functional ceramic paste corresponding to the functional ceramic sheet is applied to the surface of the insulation ceramic base by a printing method and is dried to form a functional ceramic film, the functional ceramic film is pressed against the surface of the insulation ceramic base to anchor the function ceramic film into the insulation ceramic base for secure attachment, and the functional ceramic film is fired to allow functional oxide materials included in the functional ceramic film to permeate the insulation ceramic base by solid diffusion so as to form the diffusion bonding layer and to change the functional ceramic film into the functional ceramic sheet.

2. A ceramic component comprising:
a previously fired insulation ceramic base;
a first functional ceramic sheet bonded to one side of the insulation ceramic base by a diffusion bonding layer having an anchoring structure;
a second functional ceramic sheet bonded to the other side of the insulation ceramic base by a diffusion bonding layer having an anchoring structure;
at least one pair of internal electrodes embedded into each of the first and second functional ceramic sheets; and
external electrodes electrically connected to the internal electrodes,
wherein functional ceramic pastes corresponding to the first and second functional ceramic sheets and having different electric characteristics are respectively applied to both the sides of the insulation ceramic base by a printing method and are dried to form first and second functional ceramic films, the first and second functional ceramic films are pressed against the insulation ceramic base to anchor the first and second functional ceramic films into the insulation ceramic base for secure attachment, and the first and second functional ceramic films are fired to allow functional oxide materials included in the first and second functional ceramic films to permeate the insulation ceramic base by solid diffusion so as to form the diffusion bonding layers and to change the first and second functional ceramic films into the first and second functional ceramic sheets.

3. A ceramic component comprising:
a previously fired insulation ceramic base;
a first functional ceramic sheet bonded to a surface of the insulation ceramic base by a diffusion bonding layer having an anchoring structure;
a second functional ceramic sheet bonded to a surface of the first functional ceramic sheet;
at least one pair of internal electrodes embedded into each of the first and second functional ceramic sheets; and
external electrodes electrically connected to the internal electrodes,
wherein a functional ceramic paste corresponding to the first functional ceramic sheet is applied to the surface of the insulation ceramic base by a printing method and is dried to form a first functional ceramic film, the first functional ceramic film is pressed against the insulation ceramic base to anchor the first functional ceramic film into the insulation ceramic base for secure attachment, and the first functional ceramic film is fired to allow functional oxide materials included in the first functional ceramic film to permeate the insulation ceramic base by solid diffusion so as to form the diffusion bonding layer and to change the first functional ceramic film into the first functional ceramic sheet,
wherein a functional ceramic paste corresponding to the second functional ceramic sheet is applied to the surface of the first functional ceramic sheet by a printing method and is dried to form a second functional ceramic film, and the second functional ceramic film is fired to allow glass frit included in the second functional ceramic film to change into liquid and back to solid for firmly bonding the second functional ceramic film to the first ceramic sheet.

4. The ceramic component of claim 1, wherein the functional ceramic paste or the first functional ceramic paste comprises less than 100 ppm of glass frit.

5. The ceramic component of claim 1, wherein the diffusion bonding layer is formed of an intermediate material between materials of the functional ceramic sheet and the insulation ceramic base.

6. The ceramic component of claim 3, wherein the diffusion bonding layer is formed of an intermediate material between materials of the first functional ceramic sheet and the insulation ceramic base.

7. The ceramic component of claim 1, wherein the insulation ceramic base comprises one of aluminum nitride, alumina, and silicon.

8. The ceramic component of claim 1, wherein the insulation ceramic base is surface treated by one of etching and polishing.

9. The ceramic component of claim 1, wherein the functional ceramic paste comprises 40 to 80 weight % of functional ceramic powder and 5 to 30 weight % of binder solid matter.

10. The ceramic component of claim 1, wherein a binder included in the functional ceramic paste has a softening point at a temperature of an isothermal and isobaric pressing process.

11. The ceramic component of claim 1, wherein the functional ceramic sheet has magnetic characteristics or semiconductor characteristics.

12. The ceramic component of claim 2, wherein the functional ceramic sheet is formed of at least one of a semiconductor material and a magnetic material.

13. The ceramic component of claim 3, wherein the first functional ceramic sheet is formed into one of a varistor and a thermistor, and the second functional ceramic sheet is formed into a resistor.

14. The ceramic component of claim 1, further comprising a protection layer formed of one of glass, epoxy, and a dielectric ceramic material to protect the functional ceramic sheet.

15. A ceramic component comprising:
a previously fired insulation ceramic base;
a first functional ceramic sheet bonded to a surface of the insulation ceramic base by a diffusion bonding layer having an anchoring structure;
a plurality of second functional ceramic sheets bonded to a surface of the first functional ceramic sheet and separate from each other;
at least one pair of internal electrodes embedded into each of the first and second functional ceramic sheets; and
external electrodes electrically connected to the internal electrodes, wherein a functional ceramic paste corresponding to the first functional ceramic sheet is applied to the surface of the insulation ceramic base by a printing method and is dried to form a first functional ceramic film, the first functional ceramic film is pressed against the insulation ceramic base to anchor the first functional ceramic film into the insulation ceramic base for secure attachment, and the first functional ceramic film is fired to allow functional oxide materials included in the first functional ceramic film to permeate the insulation ceramic base by solid diffusion so as to form the diffusion bonding layer and to change the first functional ceramic film into the first functional ceramic sheet, wherein functional ceramic pastes corresponding to the second functional ceramic sheets are applied to the surface of the first functional ceramic sheet by a printing method and are dried to form second functional ceramic films, and the second functional ceramic films are fired to allow glass frit included in the second functional ceramic films to change into liquid and back to solid for firmly bonding the second functional ceramic films to the first ceramic sheet.

16. A method of manufacturing a ceramic component, comprising:

applying a functional ceramic paste to a top surface of a previously fired insulation ceramic base wafer by printing;

drying the functional ceramic paste to form a first functional film;

forming a first internal electrode on a surface of the first functional ceramic film;

applying the functional ceramic paste to the surface of the first functional ceramic film by printing so as to cover the first internal electrode;

drying the functional ceramic paste applied to the surface of the first functional ceramic film so as to form a second functional ceramic film;

forming a second internal electrode on a surface of the second functional ceramic film;

applying the functional ceramic paste to the surface of the second functional ceramic film by printing so as to cover the second internal electrode;

drying the functional ceramic paste applied to the surface of the second functional ceramic film so as to form a third functional ceramic film;

pressing the first to third functional ceramic films;

removing a binder included in the first to third functional ceramic films;

firing the first to third functional ceramic films so as to form a single functional ceramic sheet;

breaking the functional ceramic sheet formed on the insulation ceramic base wafer into individual chips; and forming external electrodes in electric connection with exposed portions of the first and second internal electrodes that are electrically connected to the functional ceramic sheet.

17. The method of claim 16, wherein the pressing of the first to third functional ceramic films is performed under isothermal and isobaric conditions.

* * * * *